(12) United States Patent
Shinkawa

(10) Patent No.: US 8,232,696 B2
(45) Date of Patent: Jul. 31, 2012

(54) COIL STRUCTURE, COIL CONNECTION CONTROL APPARATUS, AND MAGNETIC ELECTRICITY GENERATOR

(75) Inventor: Yasuhiro Shinkawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 280 days.

(21) Appl. No.: 12/581,559

(22) Filed: Oct. 19, 2009

(65) Prior Publication Data
US 2010/0181851 A1     Jul. 22, 2010

(30) Foreign Application Priority Data

Nov. 7, 2008 (JP) ................................ 2008-286443
Nov. 26, 2008 (JP) ................................ 2008-300833

(51) Int. Cl.
*H02K 11/00* (2006.01)
(52) U.S. Cl. ....................................................... 310/71
(58) Field of Classification Search .................. 310/71, 310/260
See application file for complete search history.

(56) References Cited

U.S. PATENT DOCUMENTS

| | | | | |
|---|---|---|---|---|
| 2,874,317 | A * | 2/1959 | Couse | 310/71 |
| 4,115,915 | A * | 9/1978 | Godfrey | 29/596 |
| 7,582,999 | B2 * | 9/2009 | Atkinson | 310/179 |
| 7,675,206 | B2 * | 3/2010 | Akutsu et al. | 310/71 |
| 2007/0063596 | A1 * | 3/2007 | Akutsu et al. | 310/68 B |
| 2007/0273218 | A1 * | 11/2007 | Atkinson | 310/45 |

FOREIGN PATENT DOCUMENTS

| | | |
|---|---|---|
| JP | 54-172226 U | 12/1979 |
| JP | 60-055899 A | 4/1985 |
| JP | 63-502793 A | 10/1988 |
| JP | 5-022915 A | 1/1993 |
| JP | 05-083997 A | 4/1993 |
| JP | 5-328647 A | 12/1993 |
| JP | 11-356095 A | 12/1999 |
| JP | 2000-197392 A | 7/2000 |
| JP | 2005-354807 A | 12/2005 |
| JP | 2006-174568 A | 6/2006 |
| WO | 87/03648 A1 | 6/1987 |

OTHER PUBLICATIONS

Chinese Office Action dated Jul. 27, 2011, issued in corresponding Chinese Patent Application No. 200910220850.1.
Japanese Office Action dated Apr. 27, 2011, issued in corresponding Japanese Patent Application No. 2008-300833.
Japanese Office Action dated Jan. 25, 2012, issued in corresponding Japanese Patent Application No. 2008-300833.

* cited by examiner

*Primary Examiner* — Dang Le
(74) *Attorney, Agent, or Firm* — Westerman, Hattori, Daniels & Adrian, LLP

(57) ABSTRACT

Provided is a magnetic electricity generator having a coil structure capable of selectively changing output characteristics by using the same armature coil structure. In the magnetic electricity generator having armature coils and a magnet, the armature coils are configured with plural circuits of three-phase armature coils, wherein coil groups of each phase coil of the three-phase armature coils are divided into two or more coil groups, connection ports (T1 to T7, T9, T11, T13 to 22, T24, T26, and T28 to T30) are disposed to each coil group, and intermediate connection ports (T8, T10, T12, T23, T25, and T27) are disposed to one coil group in each phase coil, and wherein the connection ports and the intermediate connection ports are selectively connected with wires between the phase coils according to desired output voltage and current, so that output voltage characteristics can be adjusted according to connection scheme.

11 Claims, 31 Drawing Sheets

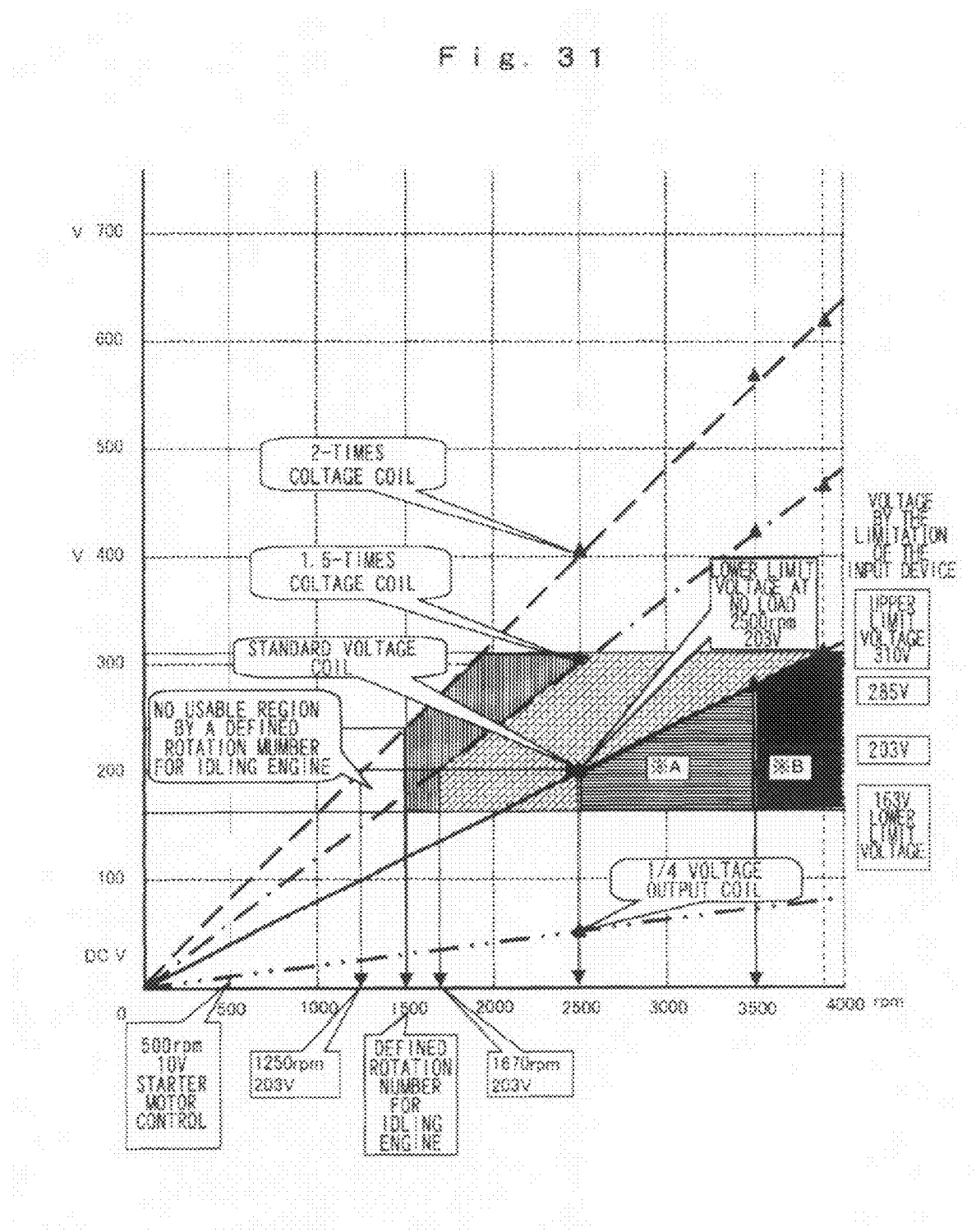

COIL STRUCTURE, COIL CONNECTION CONTROL APPARATUS, AND MAGNETIC ELECTRICITY GENERATOR

TECHNICAL FIELD

The present invention relates to an armature coil of an electricity generator or an electric motor, a coil structure of a field coil or the like, and an apparatus capable of selecting an armature coil circuit of a field coil or the like, and more particularly, to a coil structure for connection to coils that wind protruding poles of a core to which a plurality of the protruding poles corresponding to the number of slots are disposed, a magnetic electricity generator having the coil structure, a coil connection control apparatus for controlling connection to the coils, and a magnetic electricity generator having the coil connection control apparatus.

BACKGROUND ART

In a coil structure of an armature coil of an electricity generator or an electric motor, a plurality of protruding poles of a core to which the protruding poles corresponding to the number of slots are disposed are sequentially wound with coils. In the case of three-phase coil structure, three coil groups are formed.

For example, in the case of a magnetic electricity generator (three-phase synchronized electricity generator) where a permanent magnet is used for a magnetic field, output voltage and current may be defined by using design values of the number of slots or the coil turn number and dimensions of magnet. Conventionally, an armature core having the number of slots or the coil turn number based on specifications of the defined desired voltage has been manufactured.

Therefore, in the case where the conventional structure and the specifications of the output voltage and current are changed, design of the specification of a field magnet, the number of slots, the coil turn number, or the like needs to be changed so as to manufacture the armature core according to the design.

In other words, in the magnetic electricity generator, the specification of the field magnet similarly to the specifications of the armature core corresponding to the output voltage characteristics are needed to be prepared based on the output voltage characteristics. This is because the armature coil and the specifications of the field magnet cannot be changed to some type. Therefore, with respect to various output voltage specifications in a magnetic electricity generator, there are many types of the specifications of the arrangement of the coils and magnets in the magnet electricity generator. Accordingly, many types of the stocks and mold manufacturing tools are needed, so that there is a problem in that the effect of mass production cannot be obtained.

In addition, a structure wherein an intermediate tap is provided to each of the three-phase armature coils is disclosed in Patent Literature 1.

In addition, a structure of a magnetic single-phase synchronized electric motor in which the coil switching is performed by a control apparatus without the connection wire, in the case where the output voltage is increased or deceased by switching the connection to an intermediate tap in a power source transformer or the like, is disclosed in Patent Literature 2.
Citation List
Patent Literature
Patent Literature 1 Japanese Patent Application Laid-Open No. 5-328647
Patent Literature 2 Japanese Patent Application Laid-Open No. 5-22915

SUMMARY OF INVENTION

Technical Problem

In a three-phase armature coil disclosed in Patent Literature 1, with respect to a coil turn number of the armature coils connected to a power source, In the case where a voltage exceeding a voltage corresponding to a turn number sharing ratio is applied so that a rotation machine is operated by an pulse width modulation inverter having a high carrier frequency, a voltage having a short rising time and a high peak value may be applied to a port of the rotation machine. Therefore, the lifetime of the armature coils used for the rotation machine may be shortened. In order that the lifetime of the armature coil connected to the power source is not partially lopsided, the port is switched every use time. As a result, the lifetime of the armature coils is equalized to an average value, and the lifetime can be lengthened by eliminating the lopsided lifetime. In order words, the structure having an intermediate tap disclosed in Patent Literature 1 where the intermediate tap is provided to the armature coil is not configured so as to selectively change output characteristics.

In a magnetic single-phase synchronized electric motor disclosed in Patent Literature 2, an intermediate tap lead wire is drawn out from the middle of the coil number of the armature coils is connected so that the winding number of a main circuit is small at the time of starting up and so that the winding number of the main circuit is large during the synchronized operation. Therefore, the magnetic single-phase synchronized electric motor is not configured so as to change the output voltage by switching the coil connection.

In order to solve the above problems, the invention is to provide a coil structure having connection ports provided to armature coils, capable of selectively changing output characteristics by using the same structure of the armature coils and a magnetic electricity generator having the coil structure.

In addition, the invention is to provide a coil connection control apparatus having a circuit selection control unit for selecting an armature coil circuit, capable of selectively changing output characteristics by using the same structure of the armature coils and a magnetic electricity generator having the coil connection control apparatus.

Solution to Problem

According to an aspect (claim 1) of the invention, there is provided a coil structure which is configured by winding protruding poles of a core to which a plurality of the protruding poles corresponding to the number of slots are disposed with coils, by disposing connection ports to both ends of each coil for each slot, and by selectively connecting the connection ports of the coils by external connection wires according to a desired output characteristic.

The present invention of the Claim 2 is a magnetic electricity generator having armature coils and a magnet, comprising:
connection ports that are disposed to both ends of each of slots of the armature coils; and
external connection wires that selectively connect the connection ports of the armature coils according to desired output voltage and current.

The present invention of the Claim 3 is a magnetic electricity generator having armature coils and a magnet, wherein the armature coils are configured with a plurality of circuits of three-phase armature coils, coil groups of each phase coil of the three-phase armature coils are divided into two or more coil groups, connection ports are disposed to each coil group, and intermediate connection ports are disposed to one coil group or a plurality of the coil groups of each phase coil, and the connection ports and the intermediate connection ports are selectively connected with wires between the three-phase coils according to desired output voltage and current.

The present invention of the Claim 4 is the magnetic electricity generator according to claim 2, wherein the connection port is configured to be a tap as a dedicated port disposed to a coupler that is attached to the armature coil of a stator side of the magnetic electricity generator.

The present invention of the Claim 5 is the magnetic electricity generator according to claim 3, wherein the connection port and the intermediate connection port are configured to be a tap as a dedicated port disposed to a coupler that is attached to the armature coil of a stator side of the magnetic electricity generator.

The present invention of the Claim 6 is the magnetic electricity generator according to any one of claims 2 to 5, wherein the external connection wire selectively connects the connection ports so that the armature coils can be connected in parallel or in series.

The present invention of the Claim 7 is a coil connection control apparatus comprising:

connection ports that are disposed to both ends of each of coils for each of slots, the coils winding protruding poles of a core, wherein a plurality of the protruding poles corresponding to the number of slots are disposed to the core;

a coil unit that is provided with switching device groups including a plurality of switching devices for performing connection and disconnection between the connection ports so that a plurality of types of coil circuits can be configured by switching the connection and disconnection between the connection ports; and a circuit selection control unit that selects a plurality of types of the coil circuits by controlling ON/OFF of each of the switching devices of the switching device group in the coil unit.

The present invention of the Claim 8 is a magnetic electricity generator having armature coils and a magnet, comprising:

connection ports that are disposed to both ends of each of coils constituting the armature coils;

an armature coil unit that is provided with switching device groups including a plurality of switching devices for performing connection and disconnection between the connection ports so that a plurality of types of armature coil circuits can be configured by switching the connection and disconnection between the connection ports; and a circuit selection control unit that selects a plurality of types of the armature coil circuits by controlling ON/OFF of each of the switching devices of the switching device group in the armature coil unit.

The present invention of the Claim 9 is the magnetic electricity generator according to claim 8, wherein the circuit selection control unit checks whether or not an output voltage or a load current at the time of driving the electricity generator reaches to an upper threshold value or a lower threshold value and switches the armature coil circuits by controlling ON/OFF of each of the switching devices of the switching device group.

The present invention of the Claim 10 is the magnetic electricity generator according to claim 8, wherein the circuit selection control unit selects a plurality of types of armature coil circuits by controlling ON/OFF of each of the switching devices of the switching device group by manual selecting manipulation.

The present invention of the Claim 11 is the magnetic electricity generator according to claim 8, further comprising a battery power source, wherein the armature coil circuit is selected by the circuit selection control unit so that the magnetic electricity generator can be operated as a DC electric motor that is directly driven by the battery power source.

ADVANTAGEOUS EFFECTS OF INVENTION

According to the coil structure (Claim 1) of the invention, a plurality of connection ports are disposed to the coils and a connection scheme of connecting the external connection wires to the connection ports is changed, so that the coils can be selectively connected. Accordingly, a plurality of types of output characteristics can be obtained in the armature coils or field coils of an electricity generator or an electric motor.

According to the magnetic electricity generator (Claims 2 to 6) of the invention, a connection scheme of connecting the external connection wires is changed, so that a structure having a plurality of types of output voltage and current characteristics can be implemented.

Therefore, in the state that a stator armature coil is used as a common coil, a plurality of types of output voltage specifications can be easily switched, so that a stator structure having armature coils can be easily mass-produced. Accordingly, production cost of an electricity generator can be reduced.

According to the coil connection control apparatus (Claim 7) of the invention, a circuit selection control unit that selects coil circuits by controlling ON/OFF of each switching device of a switching device group is provided, so that a plurality of types of the coil circuits can be selected in a coil unit. Accordingly, a plurality of types of output characteristics can be obtained in the armature coils or field coils of an electricity generator or an electric motor.

According to the magnetic electricity generator (Claim 8) of the invention, the armature coil circuits can be switched by controlling the coil connection by controlling ON/OFF of each switching device of a switching device group in a circuit selection control unit, so that a structure having a plurality of types of output voltage and current characteristics can be implemented.

In addition, since a plurality of types of the output voltage and current characteristics are provided, so that a rating output voltage can be secured by switching the armature coil circuit by using the circuit selection control unit even in the case where the rotation number is decreased.

In addition, in the state that a stator armature coil is used as a common coil, a plurality of types of output voltage specifications can be easily switched, so that a stator structure having armature coils can be easily mass-produced. Accordingly, production cost of an electricity generator can be reduced.

According to the magnetic electricity generator (Claim 9) of the invention, it is checked whether or not an output voltage or a load current at the time of driving an electricity generator reaches to an upper threshold value or a lower threshold value, and ON/OFF of each switching device of a switching device group is controlled according to the result of the checking. Therefore, the armature coil circuit can be automatically switched.

According to the magnetic electricity generator (Claim 10) of the invention, ON/OFF of each switching device of a switching device group is controlled by manual selecting manipulation so as to select armature coil circuits. Accordingly, a desired output voltage and current characteristic can be obtained by mode switching.

According to the magnetic electricity generator (Claim 11) of the invention, an armature coil circuit having a small applying voltage for driving is selected by a circuit selection control unit, so that a magnetic electricity generator as a DC electric motor for direct driving can be operated by a battery power source. Accordingly, a transformer for increasing or decreasing the DC voltage of the battery power source or a start-up motor is not needed.

BRIEF DESCRIPTION OF DRAWINGS

FIG. 31 is a graph showing characteristics of DC voltages after three-phase rectification at the rotation numbers in no-load of a magnetic electricity generator having armature coils according to first to fourth connection examples of the coil connection control apparatus.

DESCRIPTION OF EMBODIMENTS

Exemplary embodiments of the invention will be described with reference to the accompanying drawings.

Although the invention relates to a coil structure of an electricity generator or an electric motor, hereinafter, examples of an armature coil structure adapted to a magnetic electricity generator are described with reference to FIGS. 1 to 12.

Figure 1:
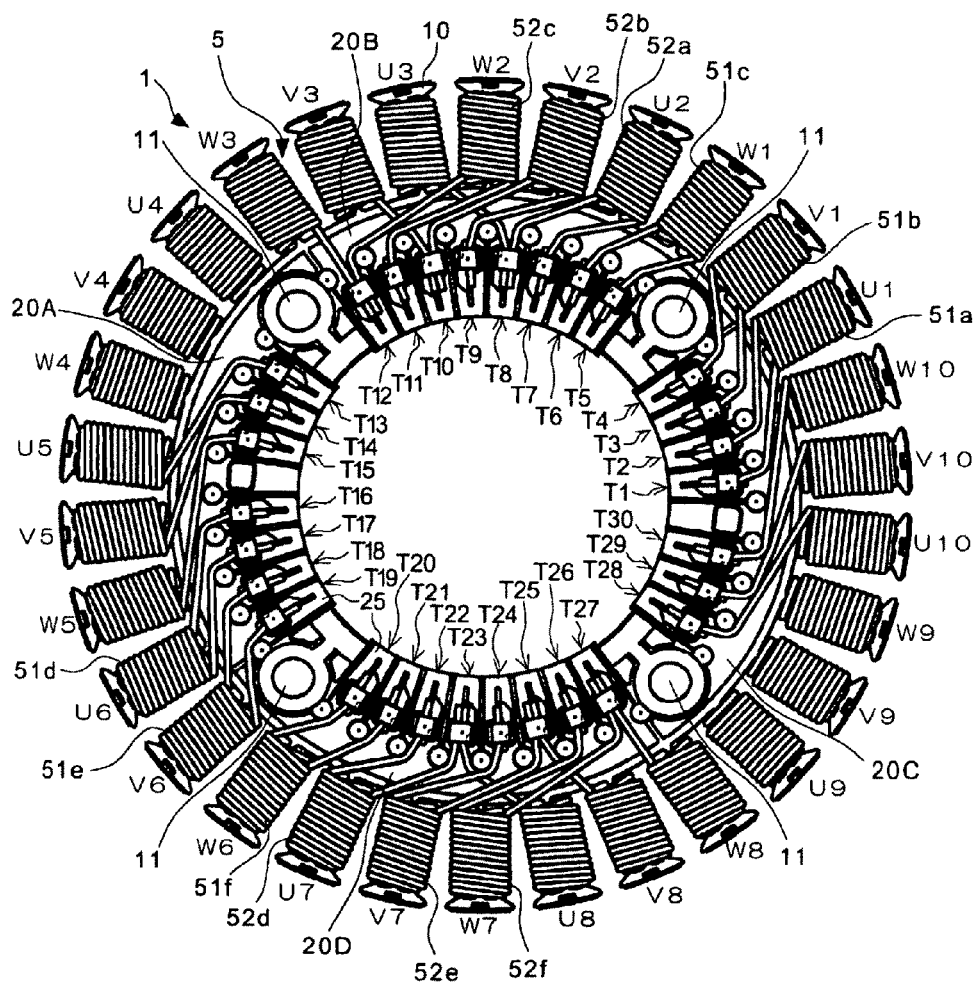
FIG. 1 is a front view for explaining a stator structure having an armature coil structure according to an embodiment of the invention.
Figure 2:
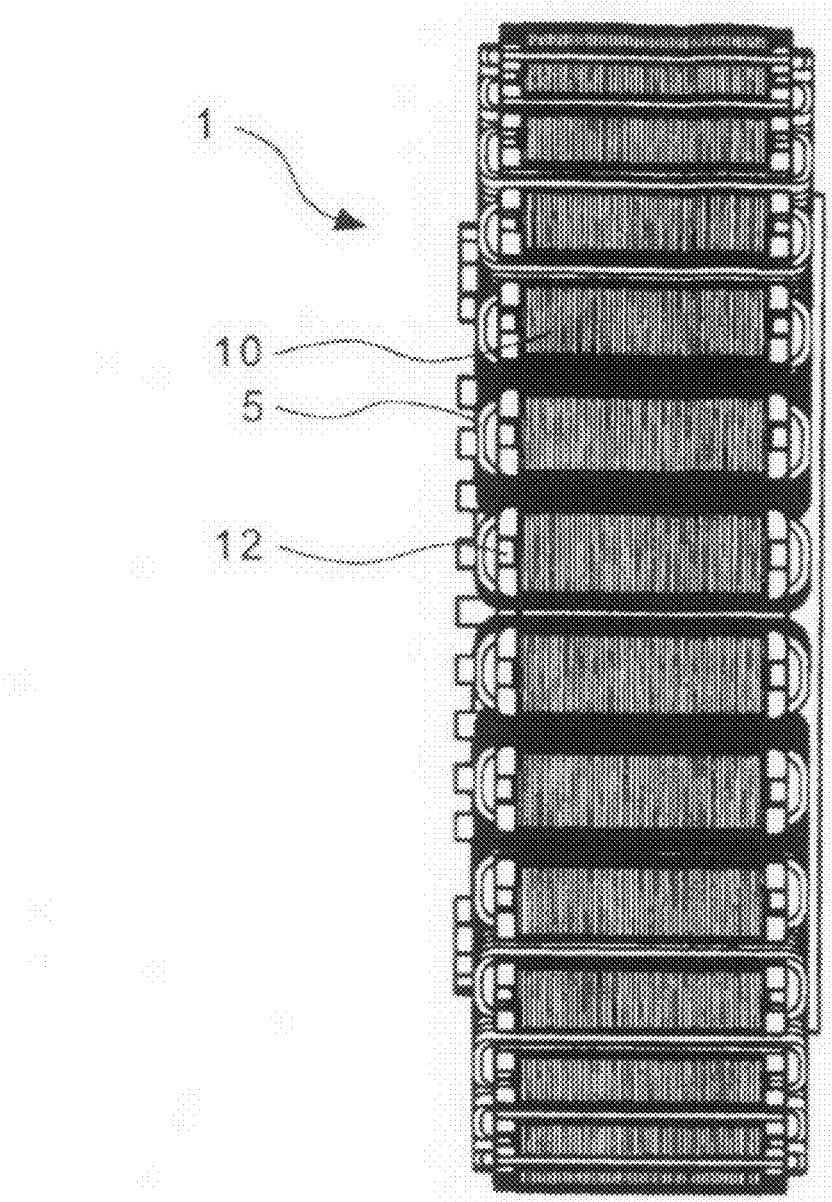
FIG. 2 is a side view for explaining the stator structure.
Figure 3:
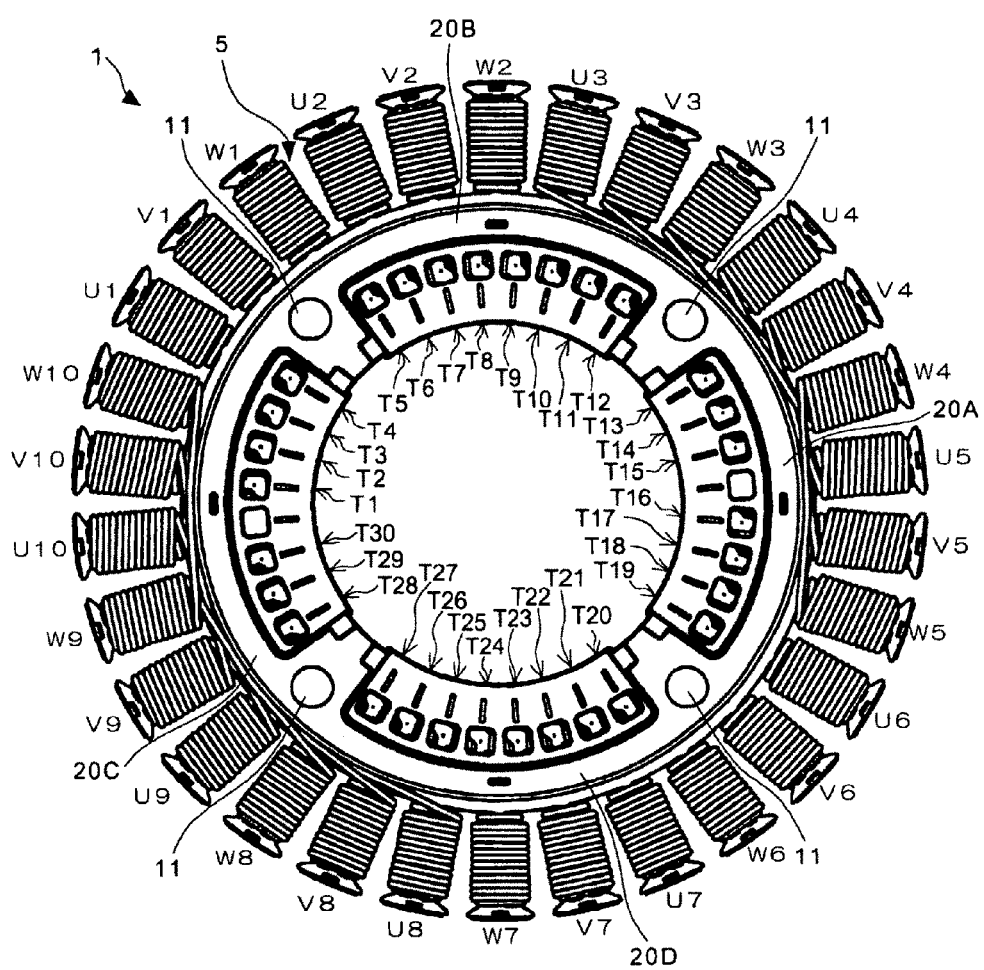
FIG. 3 is a rear view for explaining the stator structure.
Figure 4:
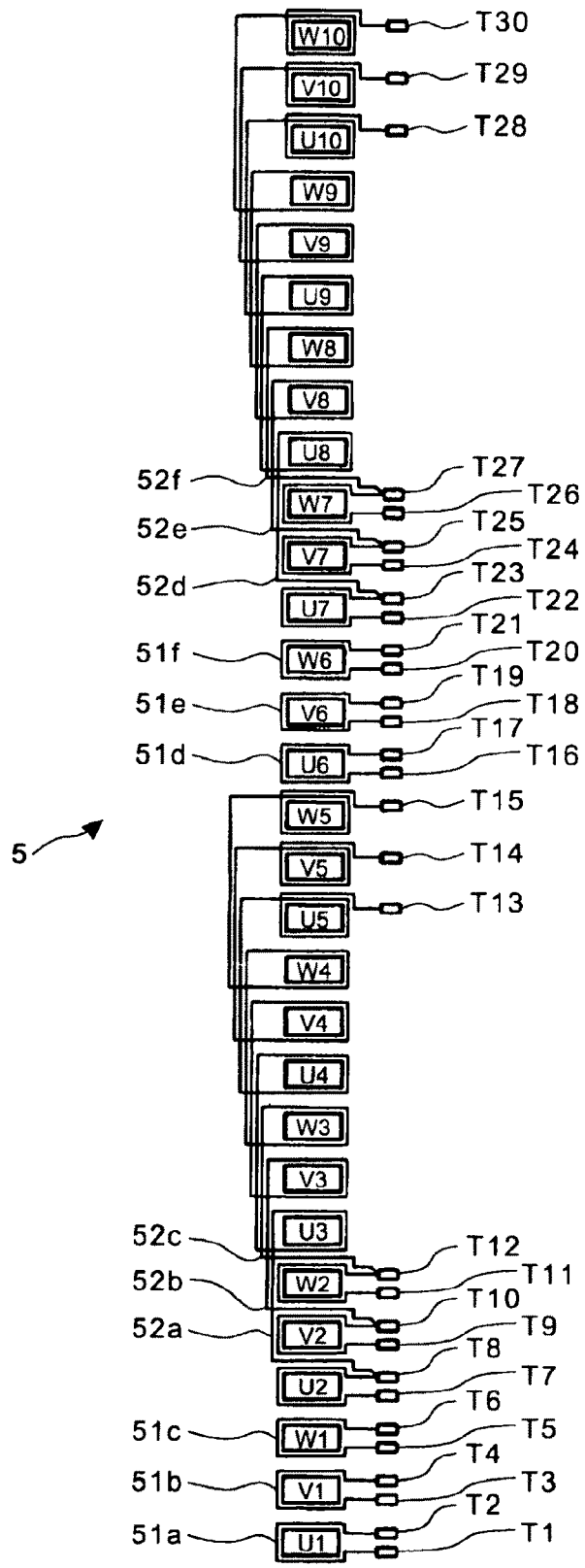
FIG. 4 is a development view of a stator.
Figure 5:
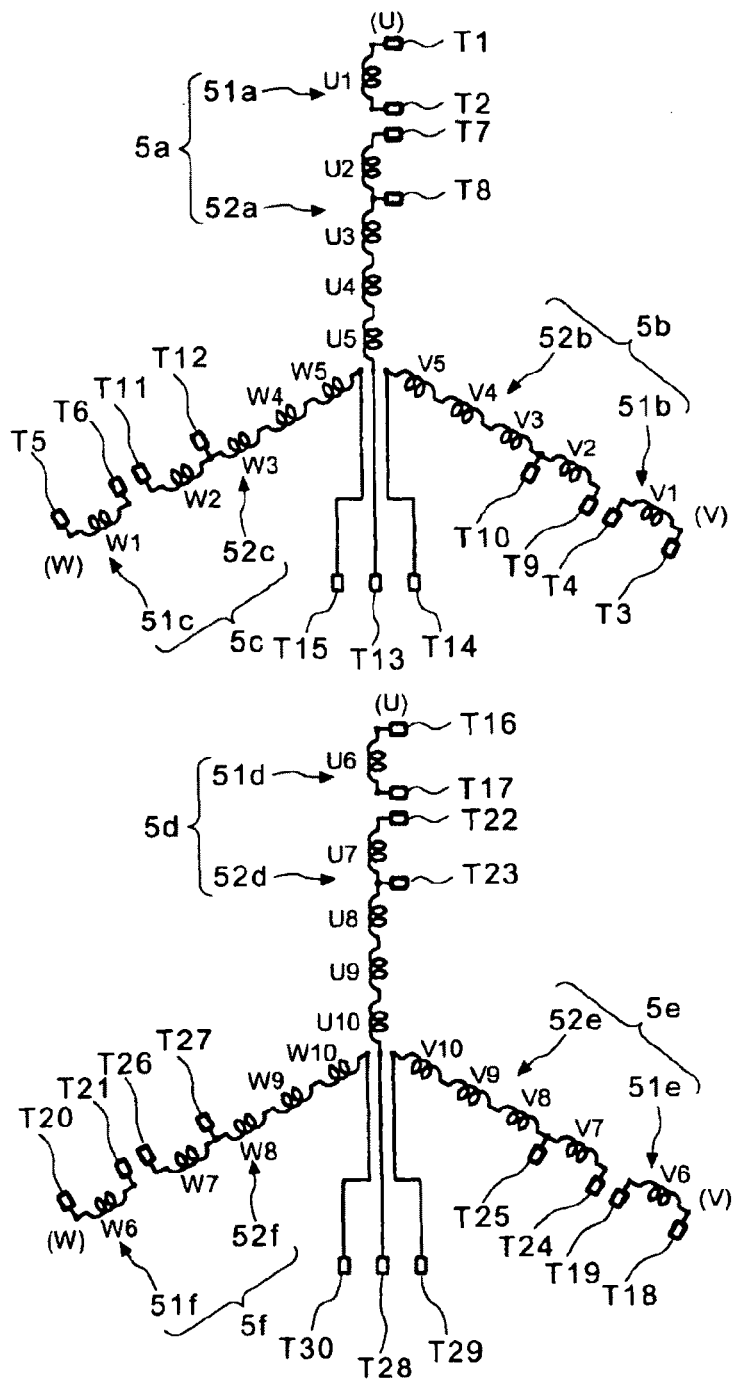
FIG. 5 is an equivalent circuit diagram of an armature coil structure according to an embodiment of the invention.

FIG. 1 is a front view for explaining a stator structure 1 of an outer rotor type magnetic electricity generator according to an embodiment of the invention. FIGS. 2 and 3 are a side view and a rear view for explaining the stator structure 1 of the magnetic electricity generator. FIGS. 4 and 5 are a development and an equivalent circuit diagram of a stator core.

The stator structure 1 having a coil structure according to the invention is attached to, for example, the crank case or the like of an engine that is a driving power source of the electricity generator by using bolts passing through four bolt through-holes 11. A bottom-closed cylindrical rotor yoke (not shown) that is connected to an end portion of the output shaft of the engine to rotate is disposed to the circumferential side of the stator structure 1. A plurality of permanent magnets for a magnetic field is attached on an inner surface of the rotor yoke. The outer rotor type magnetic electricity generator includes the rotor yoke and the stator structure 1.

The stator structure 1 is configured to include a ring-shaped stator core 10, around which a plurality of protruding poles corresponding to the number of slots are disposed, and couplers (20A to 20D) that are divided into four portions in a circumferential direction to constitute a ring-shaped body as a whole.

The stator core 10 includes a ring-shaped base and thirty protruding poles that are formed to protrude from the base in the radial direction. The stator core 10 is constructed by forming a core plate from a thin silicon steel plate through a punching process and by repeating the process of forming of the core plate.

FIG. 1 shows a stator structure 1. In the stator structure 1, a coupler 20 is attached to the stator core 10, and each of protruding poles of the stator core 10 is wound with a stator coil 5 through a bobbin including an insulating material such as a synthetic resin. In addition, the end portion (outlet) of the stator coil 5 winding each protruding pole is connected to each conductive connection port 25 disposed at a predetermined position of the coupler 20, so that terminals T1 to T30 are configured.

Each of the connection port 25 is configured with a conductive metal piece (dedicated port) having a shape capable of being disposed to each of the terminals T1 to T30. Therefore, the connection port is configured to be a connection port or an intermediate connection port as a tap to the stator coil 5 by fixing the connection to the end portion of the stator coil 5.

As shown in the equivalent circuit diagram of FIG. 5, the stator structure 1 is provided with two 3-phase circuits, each of which has one combination of main coils corresponding to five protruding poles among the main coils winding the 30 protruding poles of the stator core 10. In other words, the first three-phase circuit having the U-phase, the V-phase, and the W-phase is constructed with the U-phase coil 5a, the V-phase coil 5b, and the W-phase coil 5c that wind the protruding poles U1 to U5, the protruding poles V1 to V5, and the protruding poles W1 to W5, respectively. In addition, the second three-phase circuit having the U-phase, the V-phase, and the W-phase is constructed with the U-phase coil 5d, the V-phase coil 5e, and the W-phase coil 5f that wind the protruding poles U6 to U10, the protruding poles V6 to V10, and the protruding poles W6 to W10, respectively. In addition, the terminals T1 to T30 are disposed as the connection ports and the intermediate connection ports to desired positions of the U-phase coil 5a, the V-phase coil 5b, the W-phase coil 5c, the U-phase coil 5d, the V-phase coil 5e, and the W-phase coil 5f. The formation positions of the connection ports and the intermediate connection ports will be described later in detail.

In addition, the three-phase output of the main coil is supplied to an electrode load after a conversion process according to the purpose such a process of converting the three-phase output into an AC output having a predetermined frequency by using an inverter circuit (not shown) is applied to the three-phase output.

Next, the positions of the terminals T1 to T30 as the connection ports and the intermediate connection ports in the U-phase coil 5a, the V-phase coil 5b, the W-phase coil 5c, the U-phase coil 5d, the V-phase coil 5e, and the W-phase coil 5f are described with reference to FIGS. 1, 4, and 5.

The terminals T1 and T2 are formed as the connection ports to the both ends of the coil 51a which winds the protruding pole U1. The terminal T7 (protruding pole U2 side) and the terminal T13 (protruding pole U5 side) are formed as the connection ports to the both ends of the coil 52a which winds the protruding pole U2 as the winding start and which winds the protruding pole U5 as the winding end. The terminal T8 is formed as the intermediate connection port to the side of forming the opposite terminal T7 of the protruding pole U2.

The terminals T3 and T4 are formed as the connection ports to the both ends of the coil 51b which winds the protruding pole V1. The terminal T9 (protruding pole V2 side) and the terminal T14 (protruding pole V5 side) are formed as the connection ports to the both ends of the coil 52b which winds the protruding pole V2 as the winding start and which winds the protruding pole V5 as the winding end. The terminal T10 is formed as the intermediate connection port to the side of forming the opposite terminal T9 of the protruding pole V2.

The terminals T5 and T6 are formed as the connection ports to the both ends of the coil 51c which winds the protruding pole W1. The terminal T11 (protruding pole W2 side) and the terminal T15 (protruding pole W5 side) are formed as the connection ports to the both ends of the coil 52c which winds the protruding pole W2 as the winding start and which winds the protruding pole W5 as the winding end. The terminal T12 is formed as the intermediate connection port to the side of forming the opposite terminal T11 of the protruding pole W2.

The terminals T16 and T17 are formed as the connection ports to the both ends of the coil 51d which winds the protruding pole U6. The terminal T22 (protruding pole U7 side) and the terminal T28 (protruding pole U10 side) are formed as the connection ports to the both ends of the coil 52d which winds the protruding pole U7 as the winding start and which winds the protruding pole U10 as the winding end. The terminal T23 is formed as the intermediate connection port to the side of forming the opposite terminal T22 of the protruding pole U7.

The terminals T18 and T19 are formed as the connection ports to the both ends of the coil 51e which winds the protruding pole V6. The terminal T24 (protruding pole V7 side) and the terminal T29 (protruding pole V10 side) are formed as the connection ports to the both ends of the coil 52e which winds the protruding pole V7 as the winding start and which winds the protruding pole V10 as the winding end. The terminal T25 is formed as the intermediate connection port to the side of forming the opposite terminal T24 of the protruding pole V7.

The terminals T20 and T21 are formed as the connection ports to the both ends of the coil 51f which winds the protruding pole W6. The terminal T26 (protruding pole W7 side) and the terminal T30 (protruding pole W10 side) are formed as the connection ports to the both ends of the coil 52f which winds the protruding pole W7 as the winding start and which winds the protruding pole W10 as the winding end. The terminal T27 is formed as the intermediate connection port to the side of forming the opposite terminal T26 of the protruding pole W7.

As described above, since the connection ports and intermediate connection ports (terminals T1 to T30) are disposed to the U-phase coil 5a, the V-phase coil 5b, the W-phase coil 5c, the U-phase coil 5d, the V-phase coil 5e, and the W-phase coil 5f, the equivalent circuit diagram of the stator structure 1 of FIG. 1 is the same as those of FIG. 5.

Therefore, if the connection ports and intermediate connection ports (terminals T1 to T30) in the equivalent circuit of FIG. 5 are connected so that the selective combination of the armature coils to external connection wires is changed, a plurality of coil output voltages can be obtained from the output terminal.

Next, a first connection example of the armature coils to the external connection wires is described with reference to FIGS. 6 and 7.

Figure 6:
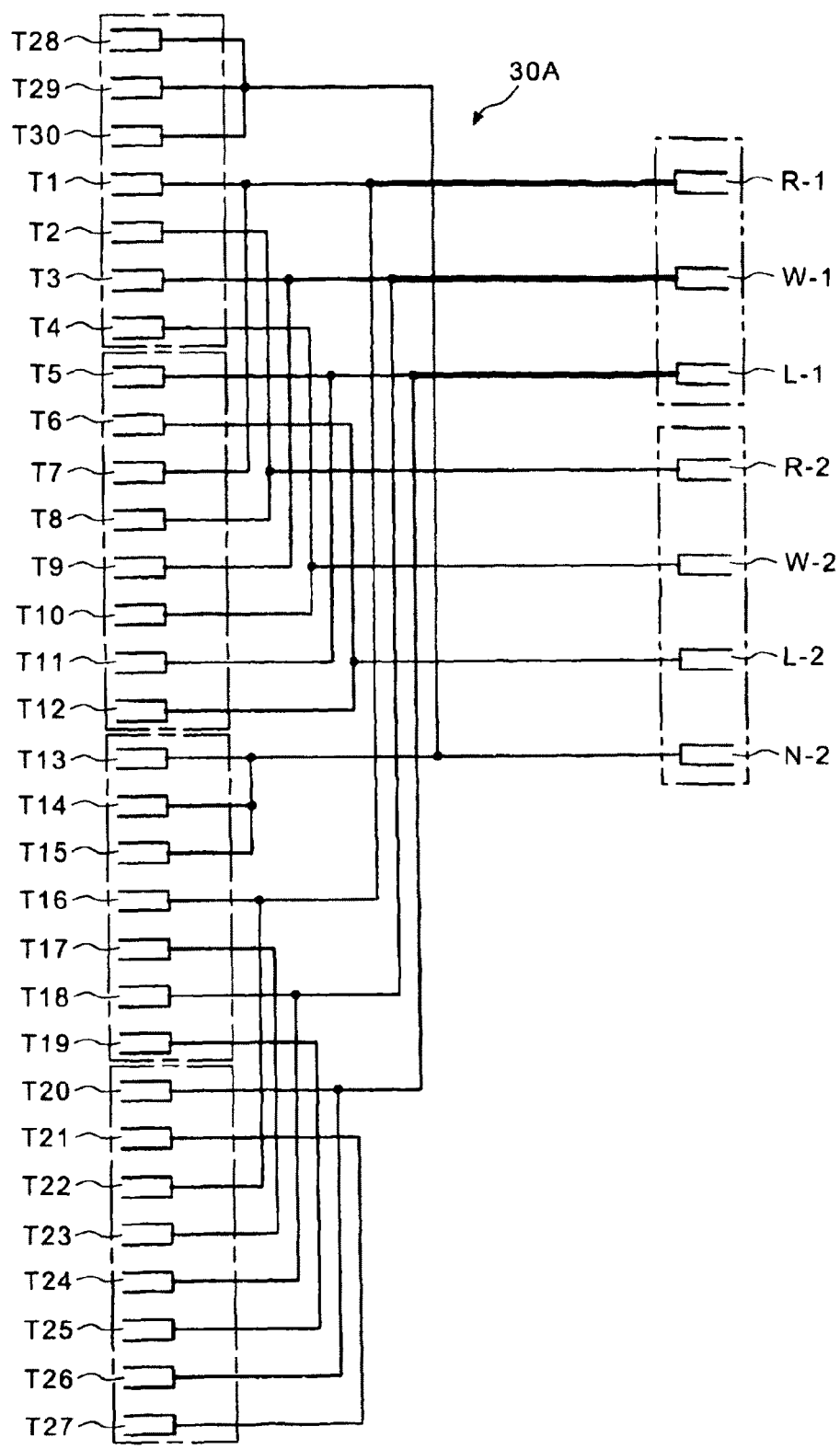
FIG. 6 is a view for explaining a connection state of an armature coil structure according to a first connection example in an embodiment of the invention.

With respect to the terminals T1 to T30 shown in FIG. 6, the terminals T13, T14, T15, T28, T29, and T30 are connected to an external connection wire 30A and to a neutral point port (N-2); and the terminals T1 and T7, T2 and T8, T16 and T22, T17, and T23 are connected to the external connection wire 30A. In addition, the terminals T1, T7, T16, and T22 are connected to the port (R-1) for obtaining an output voltage from the entire turn of the armature coils in the U-phase; and the terminals T2 and T8 are connected to the port (R-2) as an intermediate tap for obtaining a partitioned voltage of the output voltage.

In addition, the terminals T3 and T9, the terminals T4 and T10, the terminals T18 and T24, and the terminals T19 and T25 are connected to the external connection wire 30A, respectively. In addition, the terminals T3, T9, T18, and T24 are connected to the port (W-1) for obtaining an output voltage from the entire turn of the armature coils in the V-phase; and the terminals T4 and T10 are connected to the port (W-2) as an intermediate tap for obtaining a partitioned voltage of the output voltage.

In addition, the terminals T5 and T11, the terminals T6 and T12, the terminals T20 and T26, and the terminals T21 and T27 are connected to the external connection wire 30A, respectively. In addition, the terminals T5, T11, T20, and T26 are connected to the port (L-1) for obtaining an output voltage from the entire turn of the armature coils in the W-phase; and the terminals T6 and T12 are connected to the port (L-2) as an intermediate tap for obtaining a partitioned voltage of the output voltage.

Figure 7:
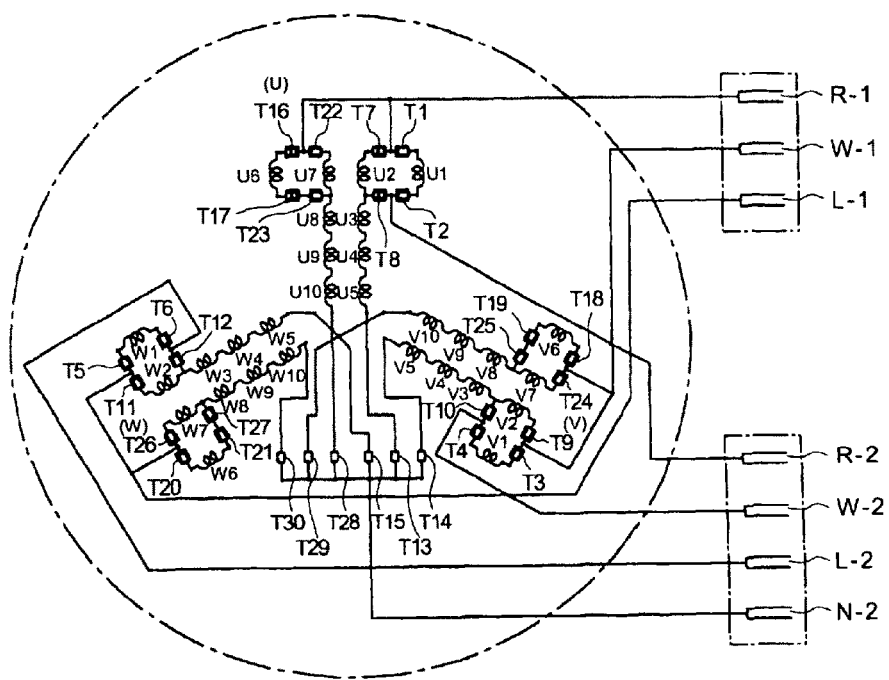
FIG. 7 is an equivalent circuit diagram of the armature coil structure according to the first connection example in an embodiment of the invention.

As a result, the equivalent circuit diagram of the stator structure 1, in which the armature coils are connected to each other by the external connection wire 30A, becomes a three-phase circuit in a star wire connection having a neutral point as shown in FIG. 7. The coil groups, each of which is constructed by connecting three coils in series to a portion to which two coils are connected in parallel, are connected to each other in parallel so that the circuit in each phase is constructed (first connection example).

Next, a second connection example of the armature coils to the external connection wires is described with reference to FIGS. 8 and 9.

Figure 8:
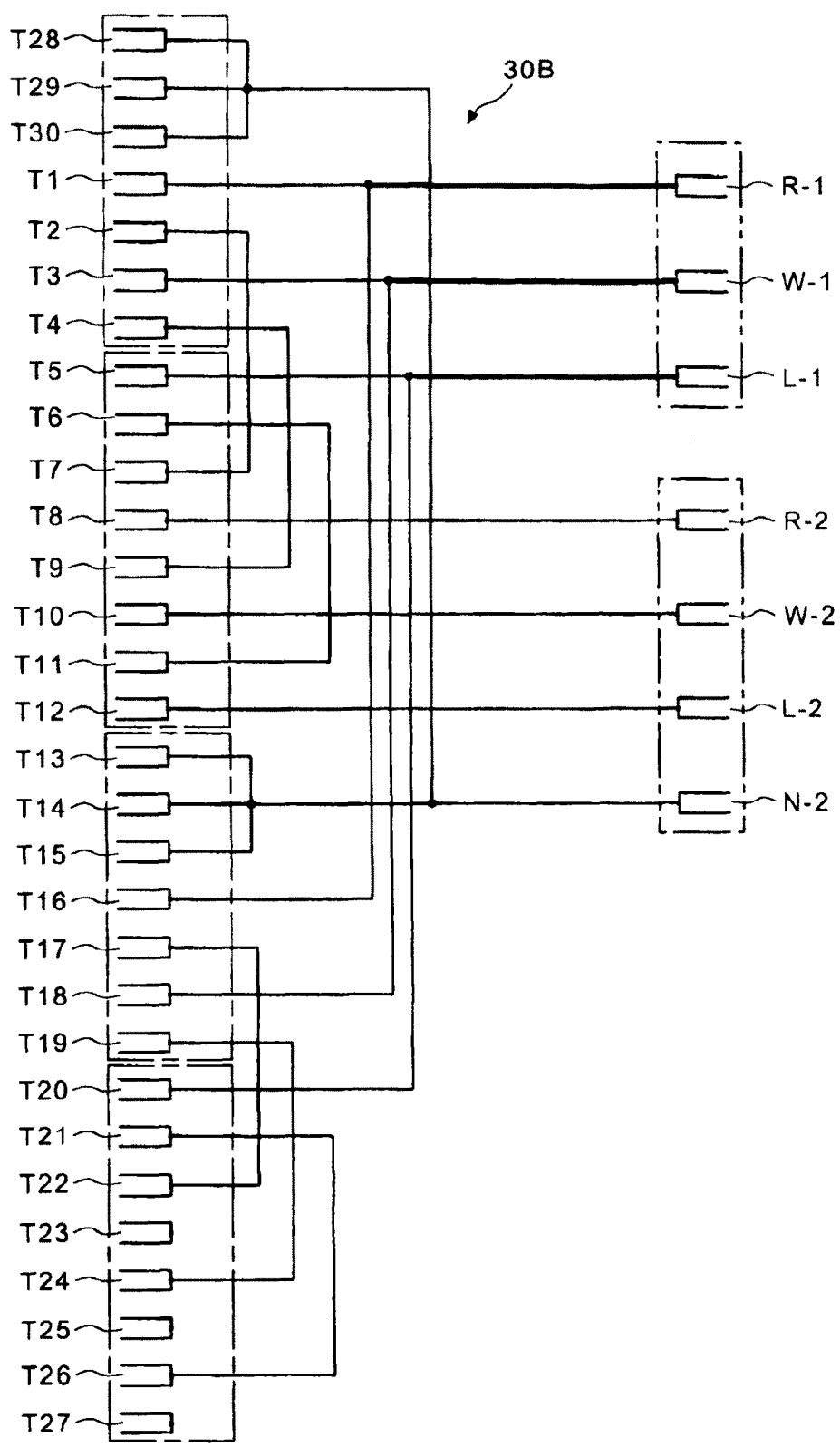
FIG. 8 is a view for explaining a connection state of an armature coil structure according to a second connection example in an embodiment of the invention.

With respect to the terminals T1 to T30 shown in FIG. 8, the terminals T13, T14, T15, T28, T29, and T30 are connected to an external connection wire 30B and to a neutral point port (N-2); and the terminals T2 and T7, and the terminals T17 and T22 are connected to the external connection wire 30B. In addition, the terminals T1 and T16 are connected to the port (R-1) for obtaining an output voltage from the entire turn of the armature coils in the U-phase; and the terminal T8 is connected to the port (R-2) as an intermediate tap for obtaining a partitioned voltage of the output voltage.

In addition, the terminals T4 and T9 and the terminals T19 and T24 are connected to the external connection wire 30B. In addition, the terminals T3 and T18 are connected to the port (W-1) for obtaining an output voltage from the entire turn of the armature coils in the V-phase; and the terminal T10 is connected to the port (W-2) as an intermediate tap for obtaining a partitioned voltage of the output voltage.

In addition, the terminals T6 and T11 and the terminals T21 and T26 are connected to the external connection wire 30B. In addition, the terminals T5 and T20 are connected to the port (L-1) for obtaining an output voltage from the entire turn of the armature coils in the W-phase; and the terminal T12 is connected to the port (L-2) as an intermediate tap for obtaining a partitioned voltage of the output voltage.

Figure 9:
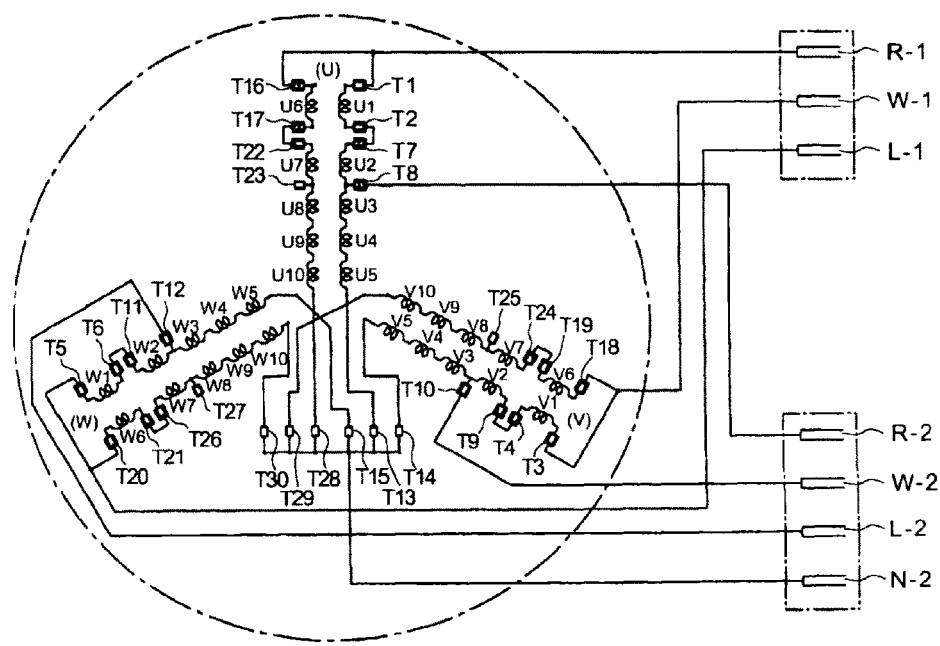
FIG. 9 is an equivalent circuit diagram of the armature coil structure according to the second connection example in the embodiment of the invention.

As a result, the equivalent circuit diagram of the stator structure 1, in which the armature coils are connected to each other by the external connection wire 30B, becomes a three-phase circuit in a star wire connection having a neutral point as shown in FIG. 9. The coil groups, each of which is constructed by connecting three coils in series to a portion to which two coils are connected in series, are connected to each other in parallel (five coils are connected to each other in parallel), so that the circuit in each phase is constructed (second connection example).

In comparison to the first connection example, according to the second connection example, the U1, U2, U6, U7, V1, V2, V6, V7, W1, W2, W6, and W7 portions in each phase are changed from the parallel connection into the series connection, the output voltage can be increased.

Next, a third connection example of the armature coils to the external connection wires is described with reference to FIGS. 10 and 11.

Figure 10:
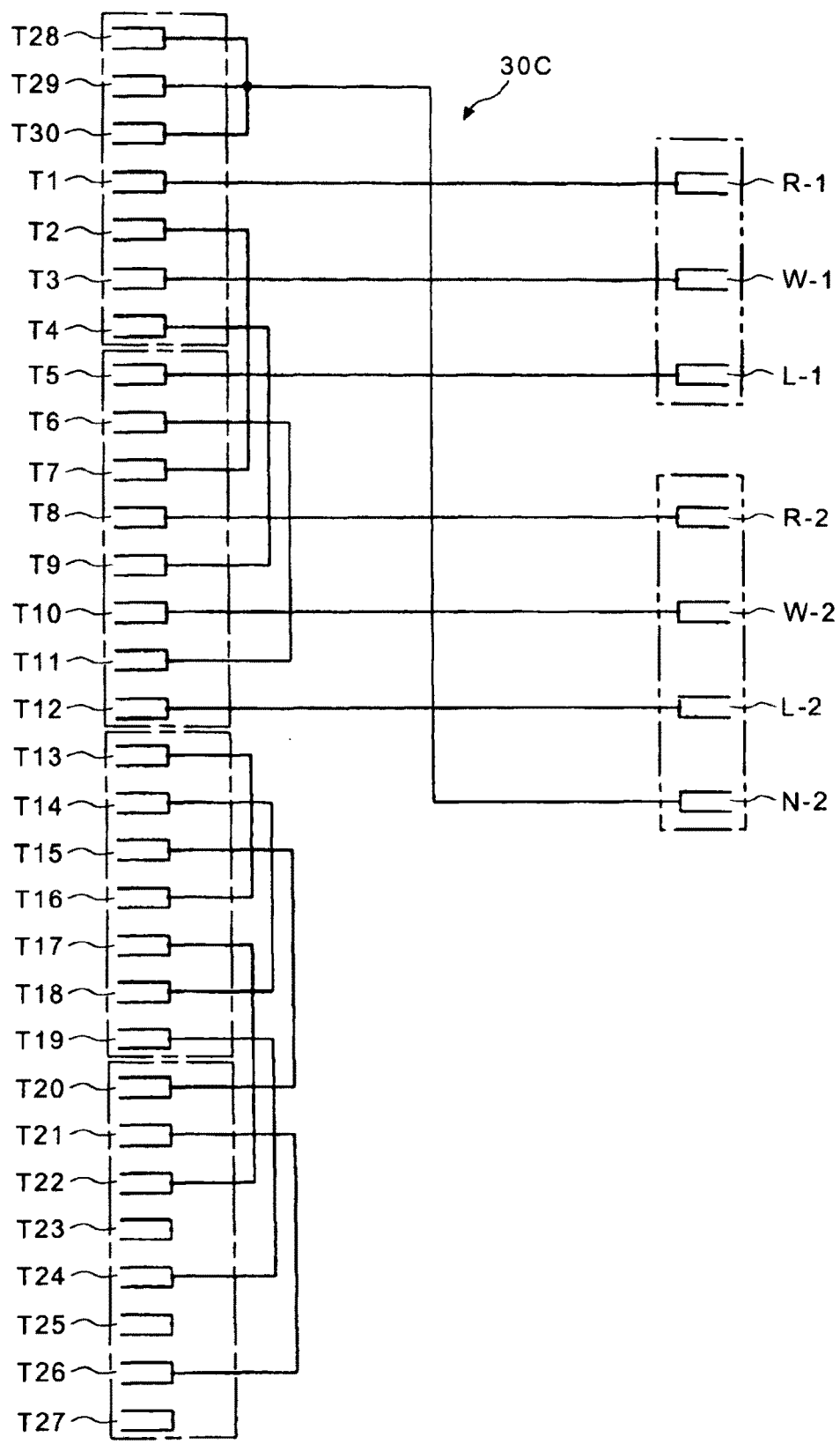
FIG. 10 is a view for explaining a connection state of an armature coil structure according to a third connection example in an embodiment of the invention.

With respect to the terminals T1 to T30 shown in FIG. 10, the terminals T28, T29, and T30 are connected to an external connection wire 30C and to a neutral point port (N-2); and the terminals T2 and T7, the terminals T13 and T16, and the terminals T17 and T22 are connected to the external connection wire 30C. In addition, the terminal T1 is connected to the port (R-1) for obtaining an output voltage from the entire turn of the armature coils in the U-phase; and the terminal T23 is connected to the port (R-2) as an intermediate tap for obtaining a partitioned voltage of the output voltage.

In addition, the terminals T4 and T9, the terminals T14 and T18, and the terminals T19 and T24 are connected to the external connection wire 30C. In addition, the terminal T3 is connected to the port (W-1) for obtaining an output voltage from the entire turn of the armature coils in the V-phase; and the terminal T25 is connected to the port (W-2) as an intermediate tap for obtaining a partitioned voltage of the output voltage.

In addition, the terminals T6 and T11, the terminals T15 and T20, and the terminals T21 and T26 are connected to external connection wire 30C. In addition, the terminal T5 is connected to the port (L-1) for obtaining an output voltage from the entire turn of the armature coils in the W-phase; and the terminal T27 is connected to the port (L-2) as an intermediate tap for obtaining a partitioned voltage of the output voltage.

Figure 11:
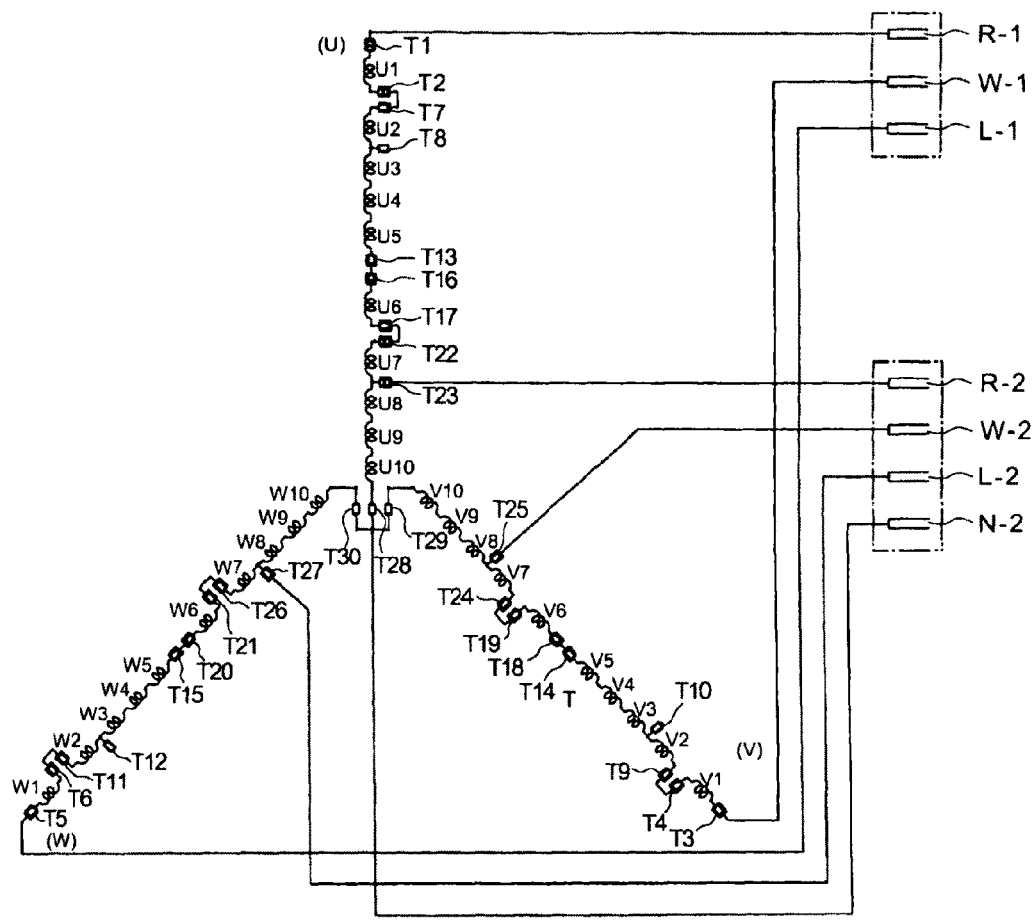
FIG. 11 is an equivalent circuit diagram of the armature coil structure according to the third connection example in the embodiment of the invention.

As a result, the equivalent circuit diagram of the stator structure 1, in which the armature coils are connected to each other by the external connection wire 30C, becomes a three-phase circuit in a star wire connection having a neutral point as shown in FIG. 11. The ten coils are connected to each other in series, so that the circuit in each phase is constructed (third connection example).

According to the third connection example, since the ten coils are connected to each other in series with respect to each phase, the output voltage that is about two times the output voltage of the second connection example can be obtained.

Figure 12:
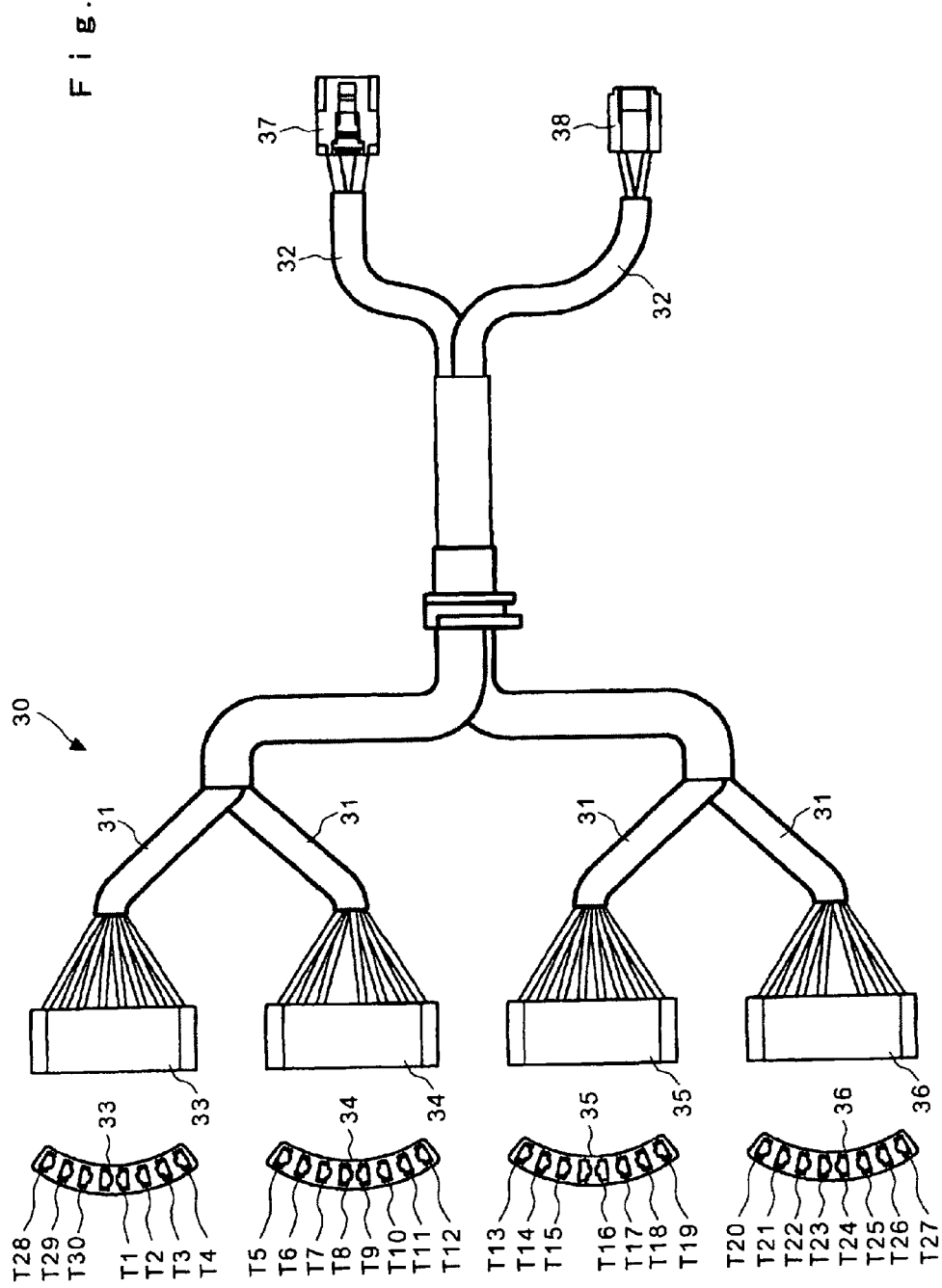
FIG. 12 is an outside view for explaining a harness used in an armature coil structure of the invention.

Each of the external connection wires 30A, 30B, and 30C according to the first to third connection examples is constructed with a harness 30 that is a wire bundle (each of wire bundles corresponding to three types of wire circuits for the external connection wires 30A, 30B, and 30C) in which desired positions are connected to each other in advance as shown in FIG. 12. In the harness 30, four branched wires 31 are disposed to the armature connection side, and two branched wires 32 are disposed to the load connection side. A connector 33 having a curved shape as a portion of arc that is connected to the terminals T28 to T30 and T1 to T4, a connector 34 that is connected to the terminals T5 to T12, a connector 35 that is connected to the terminals T13 to T19, and a connector 36 that is connected to the terminals T20 to T27 are connected to ends of the branched wires 31. In addition, a terminal port 37 that is to be connected to the aforementioned ports (R-1), (W-1), and (L-1) and a terminal port 38 that is to be connected to the ports (R-2), (W-2), (L-2), (N-2) are connected to ends of the branched wires 32.

According to the structure, when the connectors 33, 34, 35, and 36 of the harness 30 is connected to be inserted into the corresponding terminals T1 to T30 disposed in an arc shape to the couplers 20 (20A to 20D) of the stator structure 1 of FIG. 3 and when the terminal ports 37 and 38 are connected to the load side, the armature coil having a desired armature coil circuit (wire circuits corresponding to different external connection wires 30A, 30B, and 30C) can be obtained.

Therefore, only by connecting the harness 30 having the wire circuits corresponding to the external connection wires 30A, 30B, and 30C (by selecting the harness 30 having different wire circuits), different armature coil circuits can be obtained by using the same armature coil structure in the stator structure 1.

Figure 13:
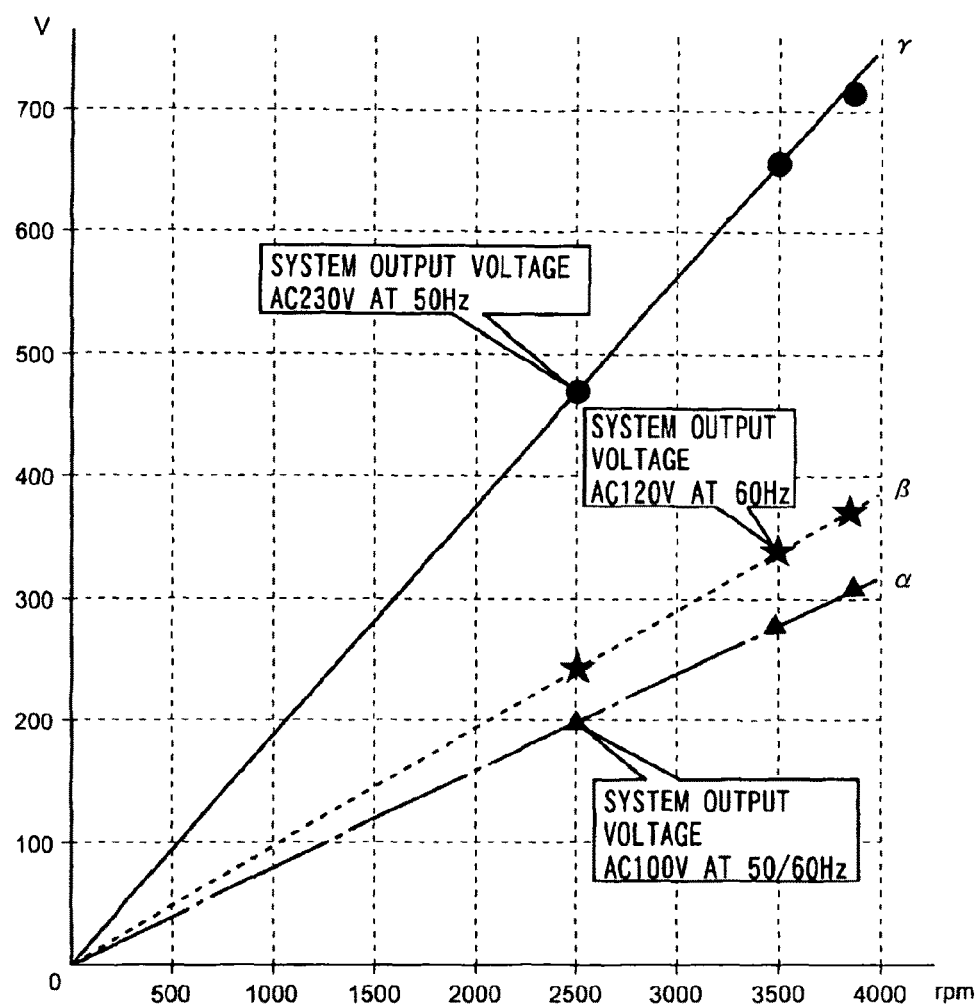
FIG. 13 is a graph showing characteristics of DC voltages after three-phase rectification at the rotation numbers of a magnetic electricity generator having an armature coil structure according to first to third connection examples.

No-load output voltage characteristic of an inverter type magnetic electricity generator having the armature coils according to the first to third connection examples is shown in FIG. 13. FIG. 3 is a graph that is obtained by measuring DC voltages after three-phase rectification at the rotation numbers (2500 rpm, 3500 rpm, and 3800 rpm) of the electricity generator. The output voltage is proportional to the rotation number. Therefore, in the obtained output voltage characteristic, the slope is increased in the order of the third connection example γ (system output voltage AC 230 V at 50 Hz), the second connection example β (system output voltage AC 120 V at 60 Hz), and the first connection example α (system output voltage AC 100 V at 50/60 Hz).

As shown in the aforementioned first to third connection examples, by switching the connection scheme of the external connection wire to the terminals T1 to T30 (selection of the harness 30), each of the coil groups (armature coils) can be connected in series or in parallel. Accordingly, a plurality of types of output voltage characteristics can be obtained.

Therefore, in the state that a structure of the stator armature coil is used as a common coil, a plurality of types of output voltage specifications can be easily switched by connecting the external connection wire, so that the manufacturing of the armature coils according to the output characteristics is not needed. As a result, in the process of manufacturing the armature coils of the stator structure 1, since the procedure changing so as to switch to different voltage specifications does not occur, the procedure changing process is removed, so that cost of managing many types of products can be reduced.

In addition, since one armature coil specification can be adapted to all the voltage types, so that manufacturing yield can be implemented. Therefore, production at a suitable time can be scheduled at an expected time that materials are inexpensive, and mass production of the armature coil can be implemented by the manufacturing yield, so that effective production cost can be reduced.

In addition, in any connection port (dedicated port) or coupler structure where a tap can be provided, a portion thereof wound with the armature coil excluding the portion corresponding to the tap can be used for different specifications. Therefore, in the case where a different specification is needed, the different specification can be manufactured only by using the molds for the connection ports and couplers, the manufacturing can be completed by minimum mold cost.

In the aforementioned examples of the magnetic electricity generator, as shown in FIG. 5, two three-phase armature coil circuits is provided, and the coil groups of each phase coil of the three-phase armature coils are divided into one coil group and four coil groups. In each coil group, in the case of the U-phase, the connection ports (T1, T2) and (T7, T13) may be provided, and the intermediate connection port T8 may be provided to the four coil groups. In addition, a star wire connection structure can be configured by selectively connecting the connection ports and the intermediate connection port among the phase coils according to desired output voltage and current.

In the structure, the connection ports may be provided to both ends of each of the coils (each of the slots of the armature coil). In this case, the external connection wire can be connected to each of the coils, so that various circuit configurations can be implemented. Accordingly, various output characteristics can be obtained.

In addition, in the aforementioned examples, the magnetic electricity generator using a permanent magnet in a magnetic field is exemplified for the description. However, the invention can be adapted to an armature coil structure of an electricity generator or an electric motor and a coil structure of a field coil or the like of an electric motor, so that the output characteristic can also be changed by adjusting the connection scheme for the external connection wire.

Next, a coil connection control apparatus according to the invention that controls connection to coils is described.

Although the coil connection control apparatus may be adapted to an electricity generator or electric motor, hereinafter, examples of the coil connection control apparatus adapted to a magnetic electricity generator are described with reference to FIGS. 14 to 31.

Figure 14:
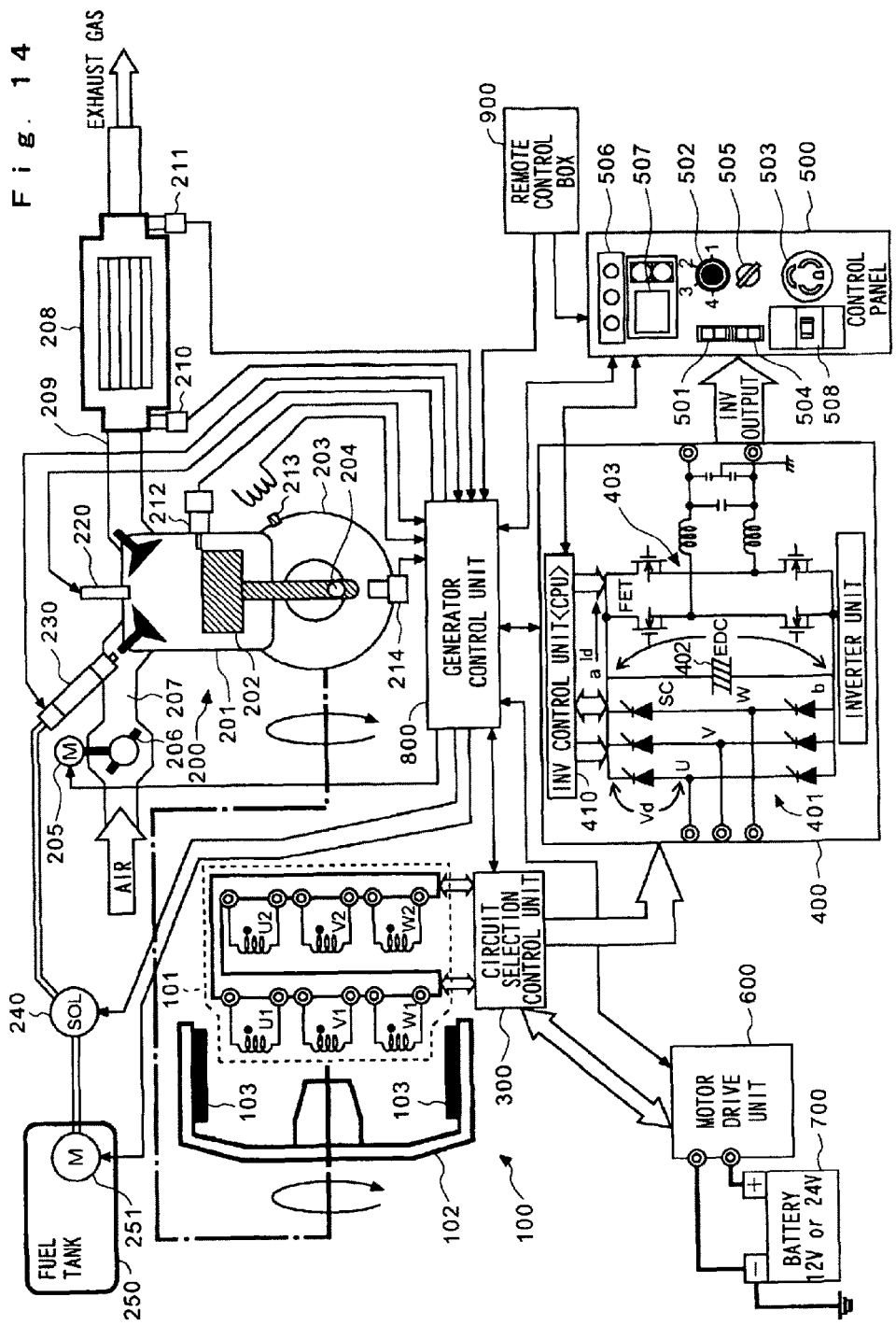
FIG. 14 is a view showing an entire configuration of an inverter electricity generator system having a magnetic electricity generator according to an embodiment of the invention.

FIG. 14 is a view showing an entire configuration of an inverter electricity generator system. The inverter electricity generator system is configured to include a magnetic electricity generator (three-phase synchronized electricity generator) 100 that has a coil unit 101 configured in three phases and a rotator 102 rotating about the coil unit 101, an engine 200 that is a driving power source of the magnetic electricity generator 100, a circuit selection control unit 300 that selects an armature coil circuit (coil circuit) in the coil unit 101, an inverter unit 400 that rectifies a three-phase output of the magnetic electricity generator 100, a manipulator 500 that inputs an output from the inverter unit 400 to manipulate the electricity generator, a motor drive unit 600 that is used to start the magnetic electricity generator 100, a battery power source 700 that is connected to the motor drive unit 600, a generator control unit 800 having a CPU that inputs signals from various sensors installed in the engine 200 or the like to control the electricity generator, and a remote control box 900 that can remotely control the generator control unit 800 and the manipulator 500.

The coil connection control apparatus includes the coil unit 101 and the circuit selection control unit 300 that is operated to select a coil circuit by controlling a coil connection scheme in the coil unit 101.

Control signals are configured to be transmitted and received between the generator control unit 800 and each of the circuit connection selection unit 300, the inverter unit 400, the manipulator 500, and the motor drive unit 600.

In the engine 200, a piston 202 is slidably disposed in a cylinder 201. The linear motion of the piston 202 is converted to the rotating motion of an output shaft (crankshaft) 204 disposed in a crank case 203. Due to the rotating motion, the rotator 102 of the electricity generator 100 is rotated, so that the electricity generator 100 generates electricity.

An air intaking tube 207 having a throttle valve 206 that is rotated by a governor motor 205 is connected to an intaking side of the cylinder 201, and an exhausting tube 209 which is provided with a ternary catalyst 208 is connected to an exhausting side. The exhausting tube 208 is provided with an O2 sensor 210 for sensing an oxygen amount and an exhausted air temperature sensor 211 for sensing an exhausted air temperature. The cylinder 201 is provided with a temperature sensor 212 for sensing an internal temperature of the cylinder. The side surface of the crankcase 203 is provided with a BTDC sensor 213 for sensing a rotating angle of the crank shaft so as to control an ignition timing. The bottom surface of the crank case 203 is provided with an oil level sensor 214 for sensing an amount of engine oil. Signals of the various sensors are input to the generator control unit 800 having a CPU. Control signals are output to an ignition plug 220 disposed at the upper portion of the cylinder 201, an injector 230, a governor motor 205, and a solenoid valve 240 disposed at the intaking side of the cylinder 201, and an electronic pump 251 disposed to an inner portion of the fuel tank 250. Therefore, the electronic pump 251 is allowed to control a fuel supplying amount from the fuel tank 250; the throttle valve 206 is allowed to control an air supplying amount; the injector 230 is allowed to control a fuel injecting amount; and the ignition plug 220 is allowed to control an ignition timing.

The circuit selection control unit 300 outputs a control signal for selecting and switching a plurality of types of armature coil circuits so as to control the coil connection in the coil unit 101 based on the control signal from the generator control unit 800. Therefore, the voltage characteristic of the three-phase output of the electricity generator is changed by the selected armature coil circuit. The configuration of the circuit selection control unit 300 and the voltage characteristics that are obtained from the switching of the armature coil circuit are described later.

The three-phase power output from the electricity generator is input to the inverter unit 400 having a control unit (CPU) 410. The inverter unit 400 includes a rectifying circuit 401 that is configured by connecting four thyristors in a bridge connection, a smoothing condenser 402 that is connected to an output side of the rectifying circuit 401, and an inverter circuit 403 that is configured by connecting four FETs in a bridge connection. The inverter unit 400 converts the input three-phase power into an AC power (INV power) having a predetermined frequency and outputs it.

The control unit (CPU) 410 performs switching control of four thyristors (SC) at the time of output a voltage from the rectifying circuit 401 and switching control of four FETs at the time of outing a voltage having a desired frequency by using an inverter circuit and performs switching the armature circuits of the coil unit 101 by using the circuit selection control unit 300. Therefore, the control unit (CPU) 410 is configured to always sense a voltage EDC between ports a and b of the both ends of the smoothing condenser 402 that is an input side of the inverter circuit 402 and an input current Id of the inverter circuit 402 to output the voltage EDC and the input current Id to the generator control unit 800.

In addition, in the case where the voltage EDC reaches to an upper threshold value or a lower threshold value (in a real case, the times that the voltage is fallen into a region of a voltage line having a threshold value for a predetermined time are sensed and determined, and detailed control method is described later), a coil switching allowable signal is output through the generator control unit 800 to the circuit selection control unit 300. The armature coil circuit (coil connection) of the coil unit 101 is switched by the control signal from the circuit selection control unit 300, so that different output voltages can be obtained at the time of driving the electricity generator. The operation of switching the armature coil circuit of the coil unit 101 by using the control signal from the circuit selection control unit 300 is described later in detail.

In addition, the control unit (CPU) 410 controls disconnecting the rectifying circuit 401 by using switching control of the thyristor at the time of occurrence of an abnormal voltage due to short-circuit failure or coil short-circuit in the armature circuit 101 or at the time of occurrence of device short-circuit failure in the circuit selection control unit 300.

In addition, a voltage (for example, Vd) across both ends of each of the thyristors included in the rectifying circuit 401 is monitored, and when Vd=0 due to a failure in a thyristor, the control unit (CPU) 410 senses the failure to disconnect the circuit.

The manipulator 500 is used to apply various manipulations to the magnetic electricity generator. The manipulator 500 includes a selection switching switch 501 that switches fixed (standard voltage coil) and variable of the armature coil circuit, a mode selection switch 502 that is operated at the variable selection time, an outlet 503 that outputs a voltage generated by the electricity generator, a frequency switching switch 504 that switches frequencies (50/60 Hz) of the output voltage, a start-up switch 505 that fixes the armature coil circuit of the electricity generator side to a start-up armature coil circuit (¼-times voltage coil described later) at the time of starting up the engine, an indicator 506 that monitors a connection switching timing of the armature coil circuit of the coil unit 101, a liquid crystal monitor 507 that displays a connection state of the armature coil circuit of the coil unit 101, and a breaker 508 that performs current disconnection over-current flows.

In the mode selection switch 502, an operation mode 1 where automatic switching to the armature coil circuit is performed, operation modes 2 to 3 where automatic switching is performed a connected load is somewhat specified, and an operation mode where an armature coil circuit capable of obtaining a maximum output voltage is fixed are configured to be selected by manual switching.

The motor drive unit 600 is used to directly drive a DC motor by a DC voltage supplied from a battery 700 at the time of starting up the electricity generator.

Next, the configuration of the magnetic electricity generator 100 is described with reference to FIGS. 15 to 19.

Figure 15:
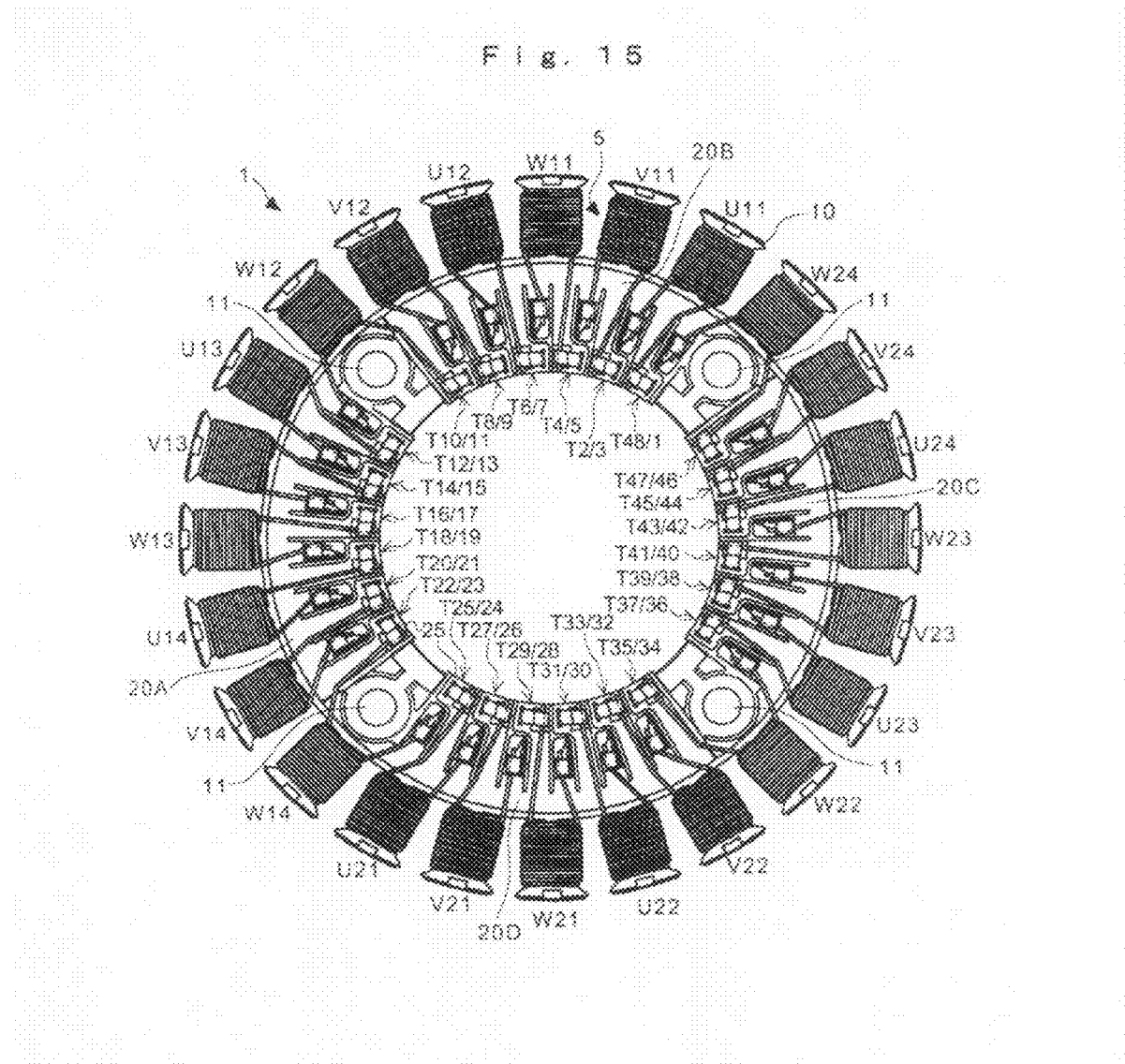
FIG. 15 is a front view for explaining a stator structure used in the magnetic electricity generator having a coil connection control apparatus according to an embodiment of the invention.
Figure 16:
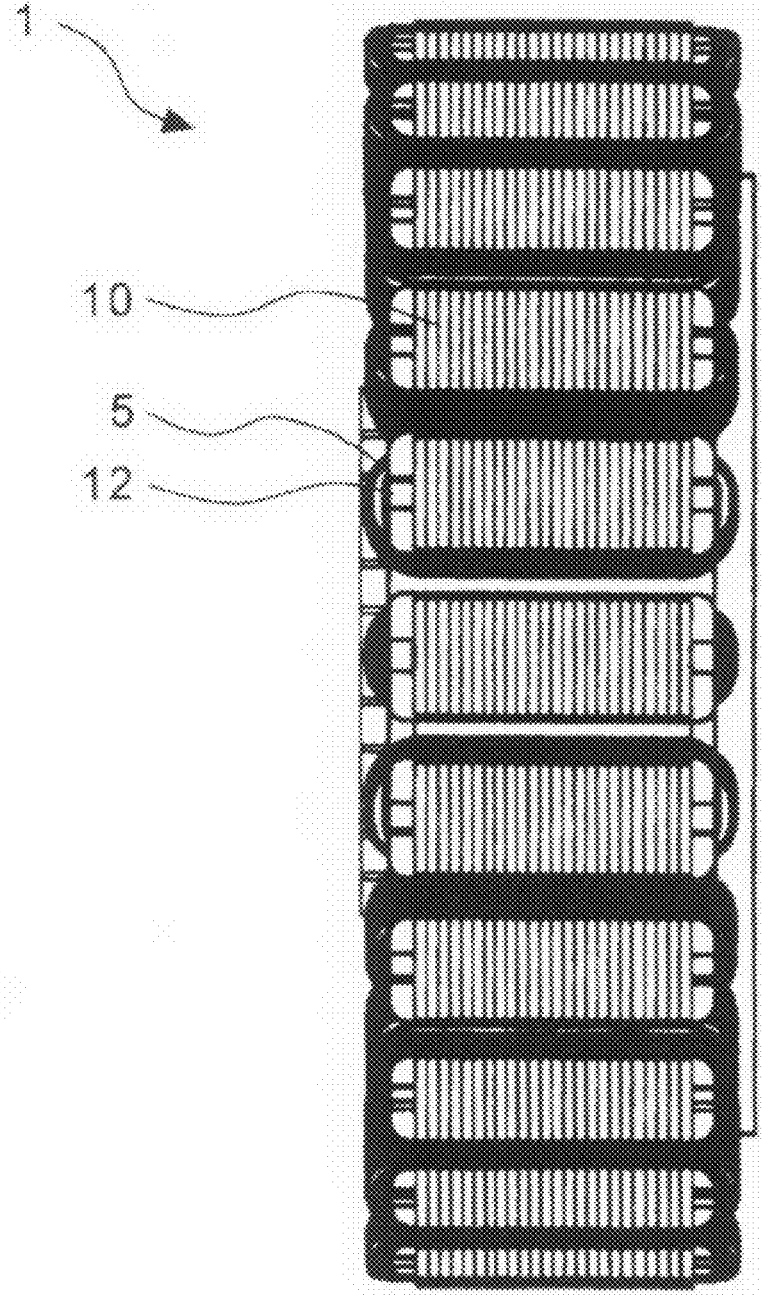
FIG. 16 is a side view for explaining the stator structure.
Figure 17:
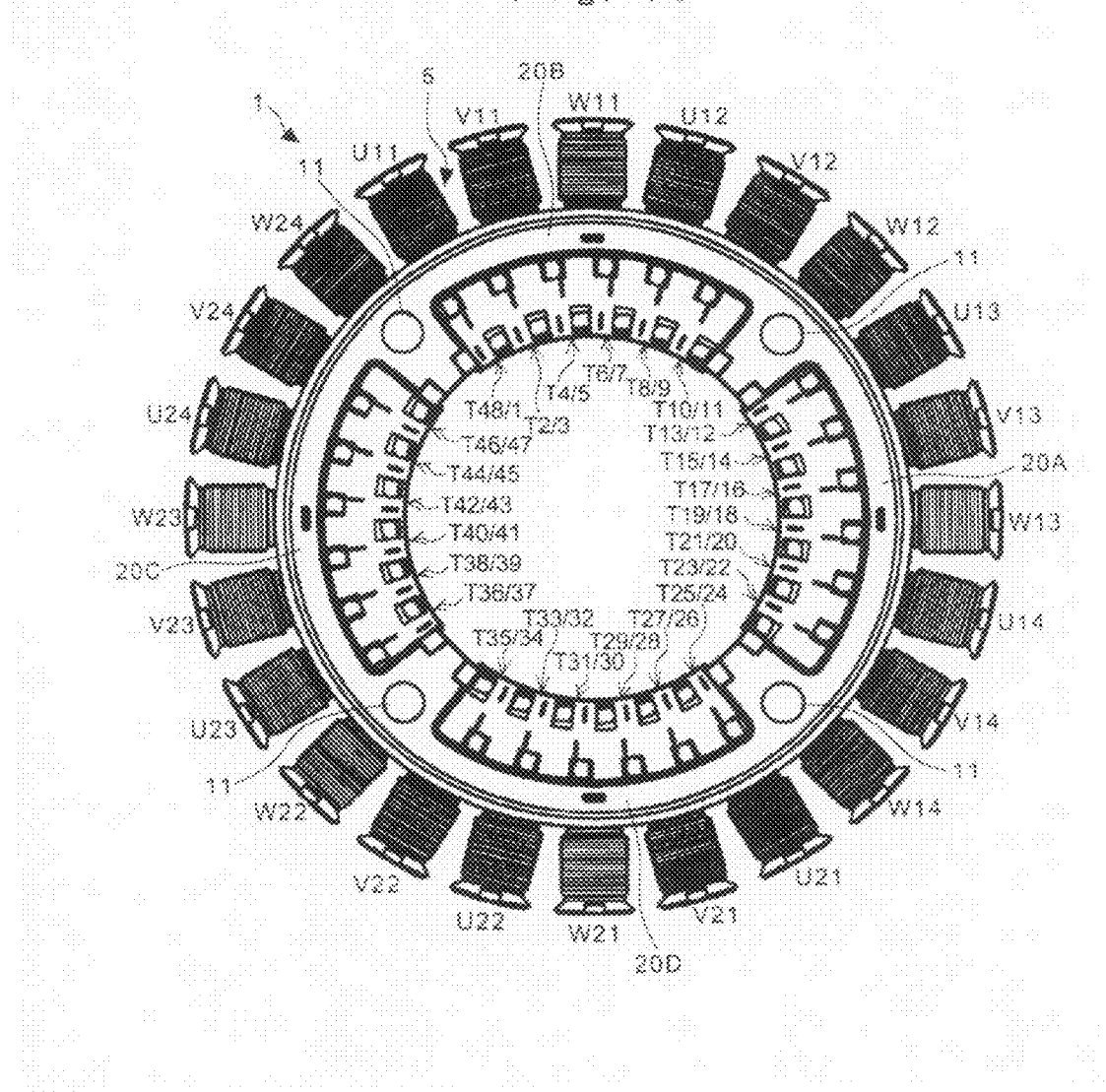
FIG. 17 is a rear view for explaining the stator structure.
Figure 18:
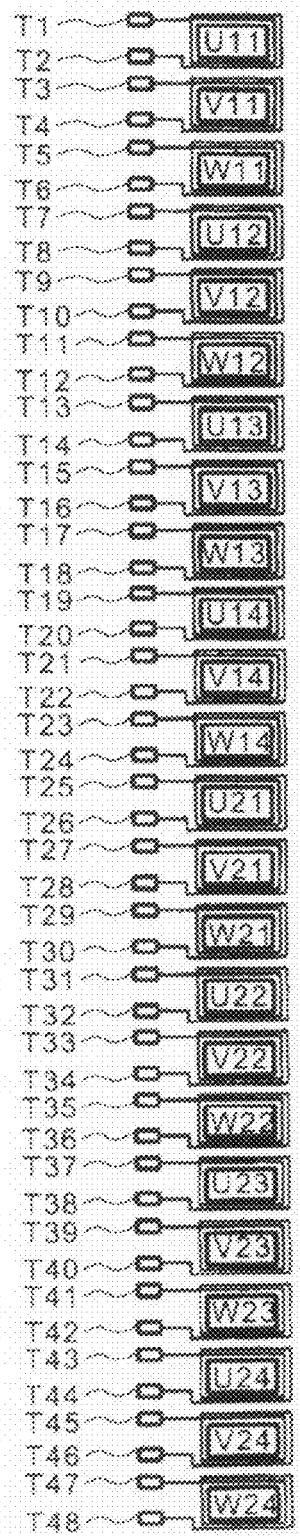
FIG. 18 is a development view of a stator.
Figure 19:
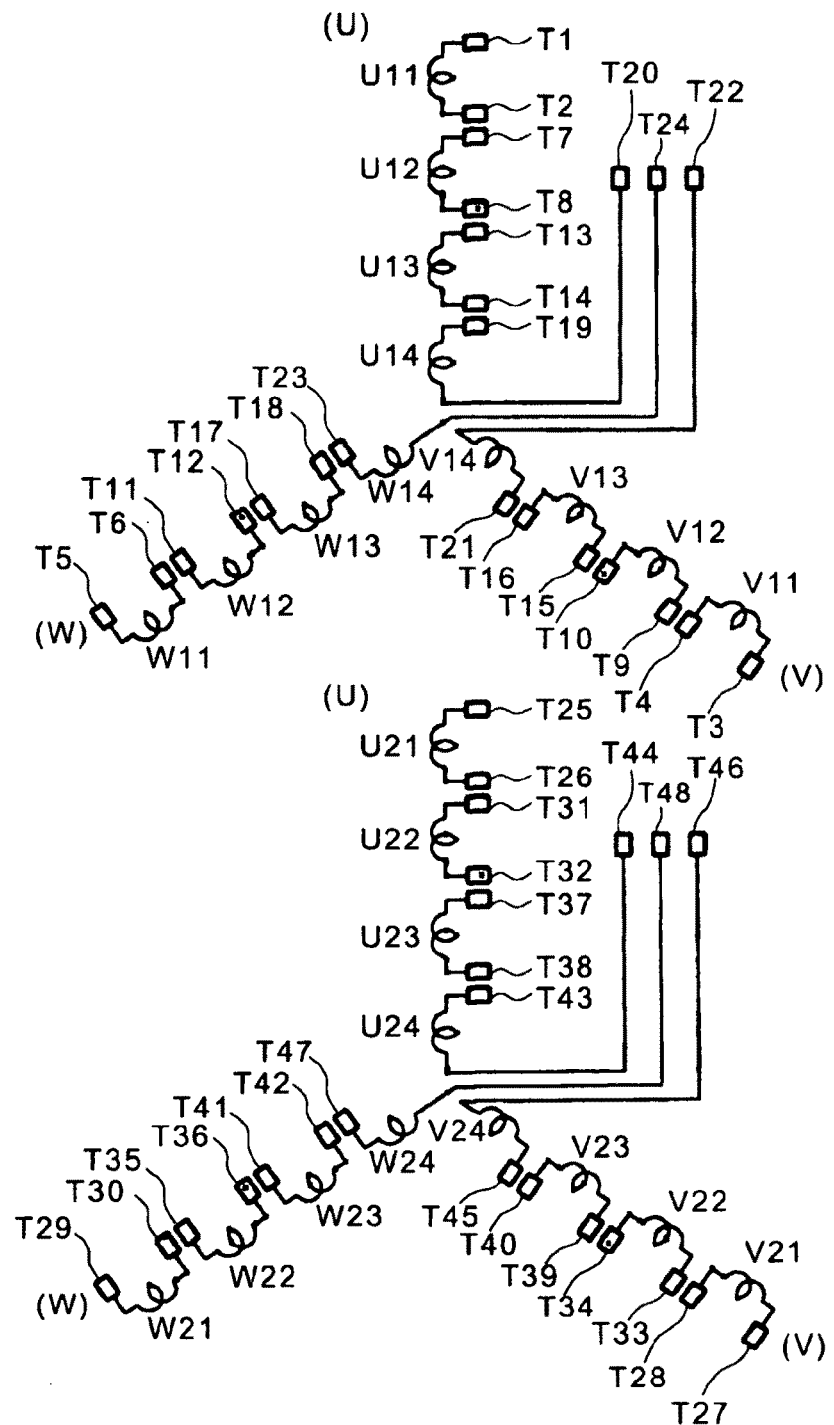
FIG. 19 is an equivalent circuit diagram of armature coils parts of the stator structure.

FIG. 15 is a front view for explaining a stator structure 1 in an outer rotor type magnetic electricity generator 100. FIGS. 16 and 17 are a side view and a rear view for explaining the stator structure 1 of the magnetic electricity generator. FIGS. 18 and 19 are a development and an equivalent circuit diagram of a stator core.

The stator structure 1 (coil unit 101) having a coil structure is attached to the front side of the crank case 203 of the engine 200 that is a driving power source of the electricity generator by using bolts passing through four bolt through-holes 11. A bottom-closed cylindrical rotator (rotor yoke) (rotator 102 in FIG. 14) that is connected to an end portion of the output shaft 204 of the engine 200 to rotate is disposed to the circumferential side of the stator structure 1. A plurality of permanent magnets 103 for a magnetic field is attached on an inner surface of the rotator 102. The outer rotor type magnetic electricity generator is constructed with the rotator 102 and the stator structure 1.

The stator structure 1 is configured to include a ring-shaped stator core 10, around which a plurality of protruding poles corresponding to the number of slots are disposed, and couplers (20A to 20D) that are divided into four portions in a circumferential direction to constitute a ring-shaped body as a whole.

The stator core 10 is constructed with a ring-shaped base and twenty four protruding poles that are formed to protrude from the base in the radial direction. The stator core 10 is constructed by forming a core plate from a thin silicon steel plate through a punching process and by repeating the process of forming of the core plate.

FIG. 15 shows a fixed structure. In the stator structure 1, a coupler 20 is attached to the stator core 10, and each of the protruding poles of the stator core 10 is wound with a stator coil 5 through a bobbin (refer to FIG. 16) that is made of an insulating material such as a synthetic resin. In addition, the end portion (outlet) of the stator coil 5 winding each protruding pole is connected to each conductive connection port 25 disposed at a predetermined position of the coupler 20, so that terminals T1 to T48 are configured.

Each of the connection port 25 is configured with a conductive metal piece (dedicated port) having a shape capable of being disposed to each of the terminals T1 to T48. Therefore, the connection port is configured to be a connection port as a tap at the both end sides of each protruding pole by fixing the connection to the end portion of the stator coil 5.

AS shown in the equivalent circuit diagram of FIG. 19, in the stator structure 1, two three-phase (U-phase, V-phase, W-phase) circuits, where the coils corresponding to the four protruding poles among the main coils winding the twenty four protruding poles of the stator core 10 are formed as one combination, can be configured. In other words, the first three-phase circuit having the U-phase, and the V-phase, and the W-phase can be formed by winding the protruding poles U11 to U14, the protruding poles V11 to V14, and the protruding poles W11 to W14 with the U-phase coil, the V-phase coil, and the W-phase coil, and the second three-phase circuit having the U-phase, and the V-phase, and the W-phase can be formed by winding the protruding poles U21 to U24, the protruding poles V21 to V24, and the protruding poles W21 to W24 with the U-phase coil, the V-phase coil, and the W-phase coil. In addition, the terminals T1 to T48 as the connection ports are formed to the positions corresponding to the protruding poles in the U-phase coil, the V-phase coil, and the W-phase coil. Therefore, by adjusting the connection positions between the connection ports, a plurality of types of armature circuits can be selectively formed, so that a plurality of types of output voltages can be obtained from the output terminal.

As shown in the development view of FIG. 18, since two connection ports are formed to corresponding to both end positions of one protruding pole, forty eight connection ports are formed with respect to the twenty four protruding poles.

More specifically, as shown in the equivalent circuit diagram of FIG. 19, as the side of forming the one three-phase circuit, the terminals T1 and T2, the terminals T3 and T4, the terminals T5 and T6, the terminals T7 and T8, the terminals T9 and T10, the terminals T11 and T12, the terminals T3 and T14, the terminals T15 and T16, the terminals T17 and T18, the terminals T19 and, T20, the terminals T21 and T22, and the terminals T23 and T24 are disposed between the both ends of the protruding pole U11, between the both ends of the protruding pole V11, between the both ends of the protruding pole W11, between the both ends of the protruding pole U12, between the both ends of the protruding pole V12, between the both ends of the protruding pole W12, between the both ends of the protruding pole U13, between the both ends of the protruding pole V13, between the both ends of the protruding pole W13, between the both ends of the protruding pole U14, between the both ends of the protruding pole V14, and between the both ends of the protruding pole W14, respectively.

In addition, as the side of forming the other three-phase circuit, the terminals T25 and T26, the terminals T27 and T28, the terminals T29 and T30, the terminals T31 and T32, the terminals T33 and T34, the terminals T35 and T36, the terminals T37 and T38, the terminals T39 and T40, the terminals T41 and T42, the terminals T43 and T44, the terminals T45 and T46, and the terminals T47 and T48 are disposed between the both ends of the protruding pole U21, between the both ends of the protruding pole V21, between the both ends of the protruding pole W21, between the both ends of the protruding pole U22, between the both ends of the protruding pole V22, between the both ends of the protruding pole W22, between the both ends of the protruding pole U23, between the both ends of the protruding pole V23, between the both ends of the protruding pole W23, between the both ends of the protruding pole U24, between the both ends of the protruding pole V24, and between the both ends of the protruding pole W24, respectively.

The connection ports are selectively connected or disconnected according to the control of ON/OFF of the later-described switching devices.

In addition, the three-phase output of the main coil is converted into AC output having a predetermined frequency by the inverter unit 400 (refer to FIG. 14) to be supplied to a load that is connected to an outlet 503 of the manipulator 500.

Next, a circuit of the circuit selection control unit 300 is described with reference to FIGS. 20 and 21. Each of switching devices disposed in the circuit selection control unit 300 are connected to each of the connection ports of the coil unit 101 through each connection line. Each of the switching devices is configured as a device that flows current in two directions by using a trigger application. For example, a triac Q is used.

Figure 20:
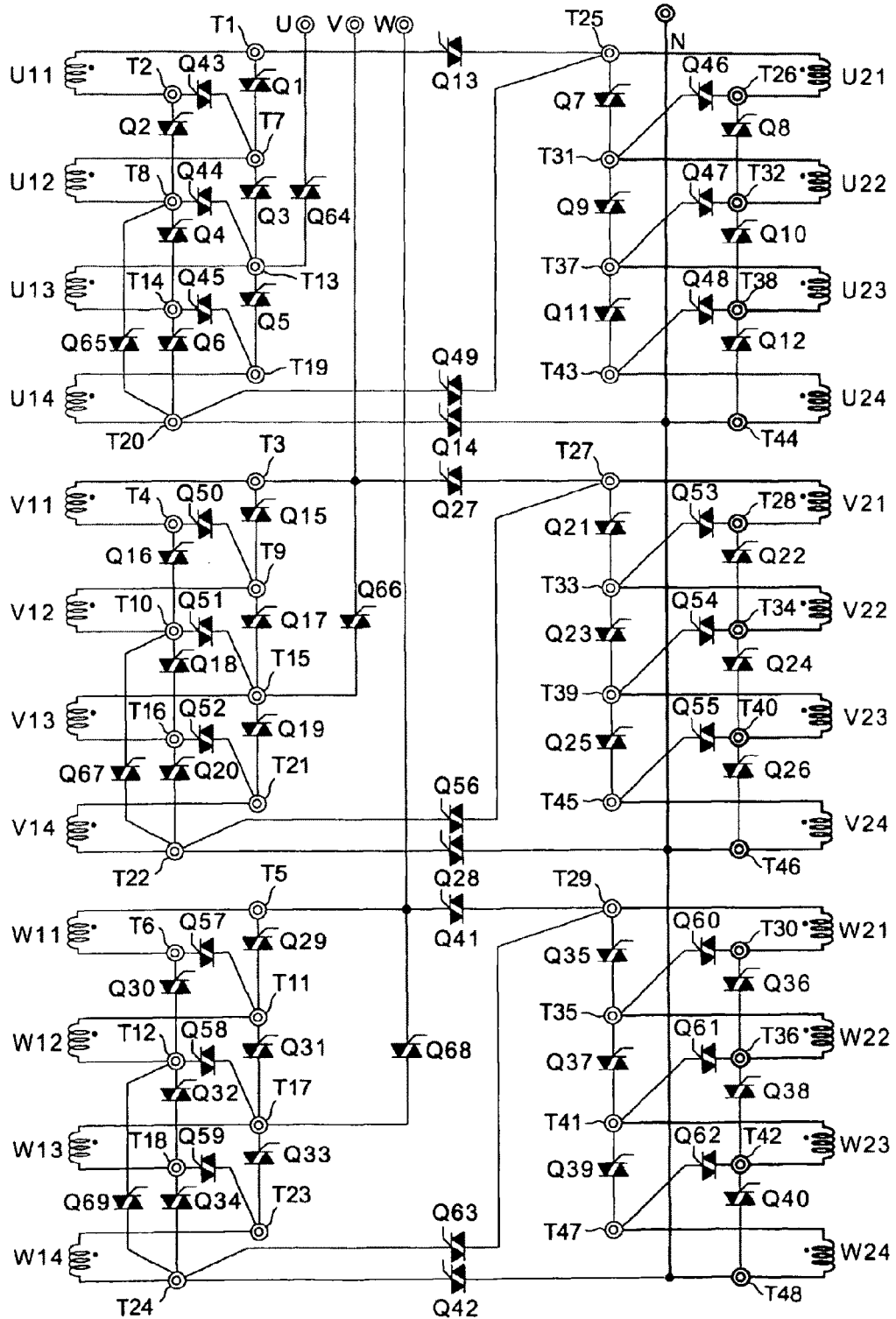
FIG. 20 is an equivalent circuit diagram of the coil connection control apparatus displaying switching devices (triacs).

More specifically, as shown in FIG. 20, the triacs Q1, Q2, Q3, Q4, Q5, Q6, Q7, Q8, Q9, Q10, Q11, Q12, Q13, and Q14 are connected between the terminals T1 and T7, between the terminals T2 and T8, between the terminals T7 and T13, between the terminals T8 and T14, between the terminals T13 and T19, between the terminals T14 and T20, between the terminals T25 and T31, between the terminals T26 and T32, between the terminals T31 and T37, between the terminals T32 and T38, between the terminals T37 and T43, between the terminals T38 and T44, between the terminals T1 and T25, and between the terminals T20 and T44, respectively.

In addition, the triacs Q15, Q16, Q17, Q18, Q19, Q20, Q21, Q22, Q23, Q24, Q25, Q26, Q27, and Q28 are connected between the terminals T3 and T9, between the terminals T4 and T10, between the terminals T9 and T15, between the terminals T10 and T16, between the terminals T15 and T21, between the terminals T16 and T22, between the terminals T27 and T33, between the terminals T28 and T34, between the terminals T33 and T39, between the terminals T34 and T40, between the terminals T39 and T45, between the terminals T40 and T46, between the terminals T3 and T27, between the terminals T22 and T46, respectively.

In addition, the triacs Q29, Q 30, Q31, Q 32, Q33, Q34, the triac Q35, Q36, Q37, Q38, Q39, Q40, Q41, and Q42 are connected between the terminals T5 and T11, between the terminals T6 and T12, between the terminals T11 and T17, between the terminals T12 and T18, between the terminals T17 and T23, between the terminals T18 and T24, between the terminals T29 and T35, between the terminals 130 and T36, between the terminals T35 and T41, between the terminals T36 and T42, between the terminals T41 and T47, between the terminals T42 and T48, between the terminals T5 and T29, and between the terminals T24 and T48, respectively.

In addition, the triacs Q43, Q44, Q45, Q46, Q47, Q48, and Q49 are connected between the terminals T2 and T7, between the terminals T8 and T13, between the terminals T14 and T19, between the terminals T26 and T31, between the terminals T32 and T37, between the terminals T38 and T43, and between the terminals T20 and T25, respectively.

In addition, the triacs Q50, Q51, Q52 Q53, Q54, Q55, and Q56 are connected between the terminals T4 and T9, between the terminals T10 and T15, between the terminals T16 and T21, between the terminals T28 and T33, between the terminals T34 and T39, between the terminals T40 and T45, between the terminals T22 and T27, respectively.

In addition, the triacs Q57, Q58, Q59, Q60, Q61, Q62, and Q63 are connected between the terminals T6 and T11, between the terminals T12 and T17, between the terminals T18 and T23, between the terminals T30 and T35, between the terminals T36 and T41, between the terminals T42 and T47, and between the terminals T24 and T29, respectively.

In addition, the triacs Q64, Q65, Q66, Q67, Q68, and Q69 are connected between the terminals T1 and T13, between the terminals T8 and T20, between the terminals T3 and T15, between the terminals T10 and T22, between the terminals T5 and T17, and between the terminals T12 and T24, respectively.

Figure 21:
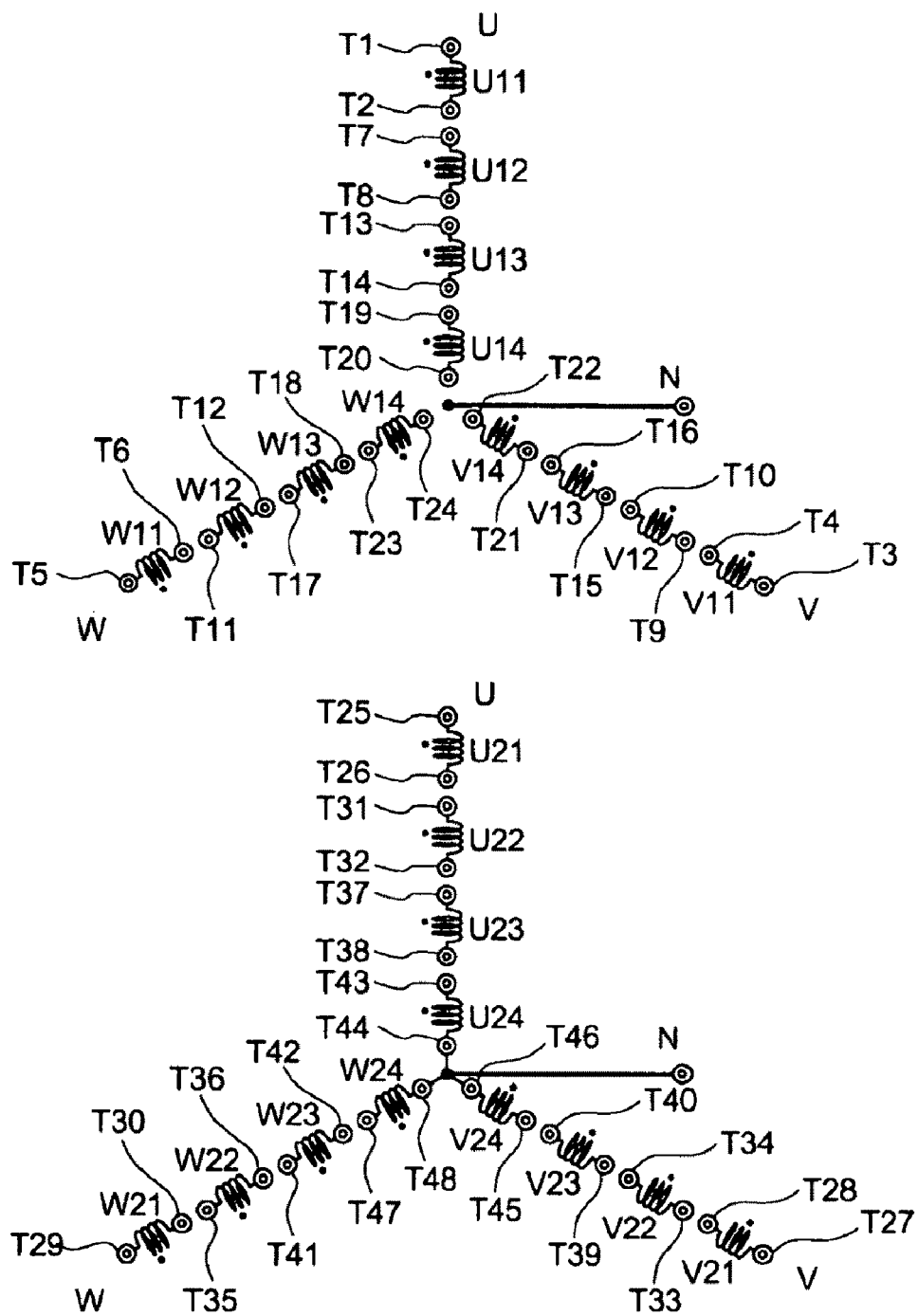
FIG. 21 is a simple equivalent circuit diagram of a coil unit.

According to the aforementioned connection, as shown in FIG. 21, a circuit capable of configuring two combinations of star wire connection with respect to the U-phase, the V-phase, and the W-phase can be implemented.

In addition, in FIG. 20, the connection and disconnection of a plurality of the triacs Q is controlled based on the control signals from the circuit selection control unit 300, so that a plurality of types of armature coil circuits can be obtained by changing connection positions.

In the armature coil circuit of the coil unit 101, an arbitrary number of circuits can be implemented by controlling the connection and disconnection of a plurality of the triacs Q. However, in real cases, various types of armature coil circuits may be designed in advance; triac Q groups that are to be in the connection state for implementing the armature coil circuit may be set; and the triacs Q of each group may be controlled to be in the ON state by the circuit selection control unit 300.

Now, an example of switching the triac Q groups by which four types of armature coil circuits can be implemented in the coil unit 101 is described.

Figure 22:
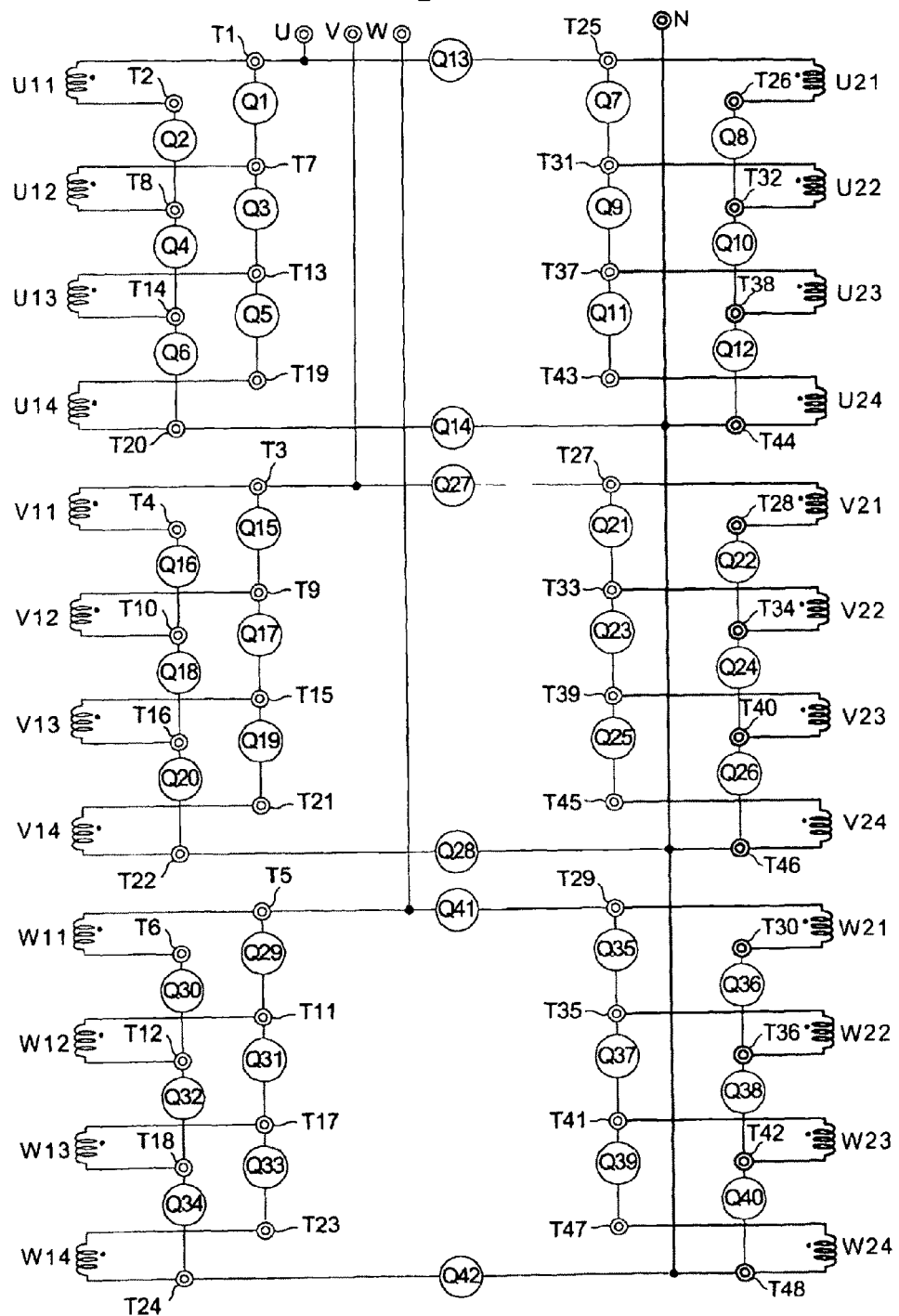
FIG. 22 is a circuit diagram for explaining a connection state of a coil connection control apparatus according to a first connection example in an embodiment of the invention.

A first connection example of connecting the armature coil circuits suitable at the time of starting up the electricity generator is described with reference to FIGS. 22 and 23.

Figure 23:
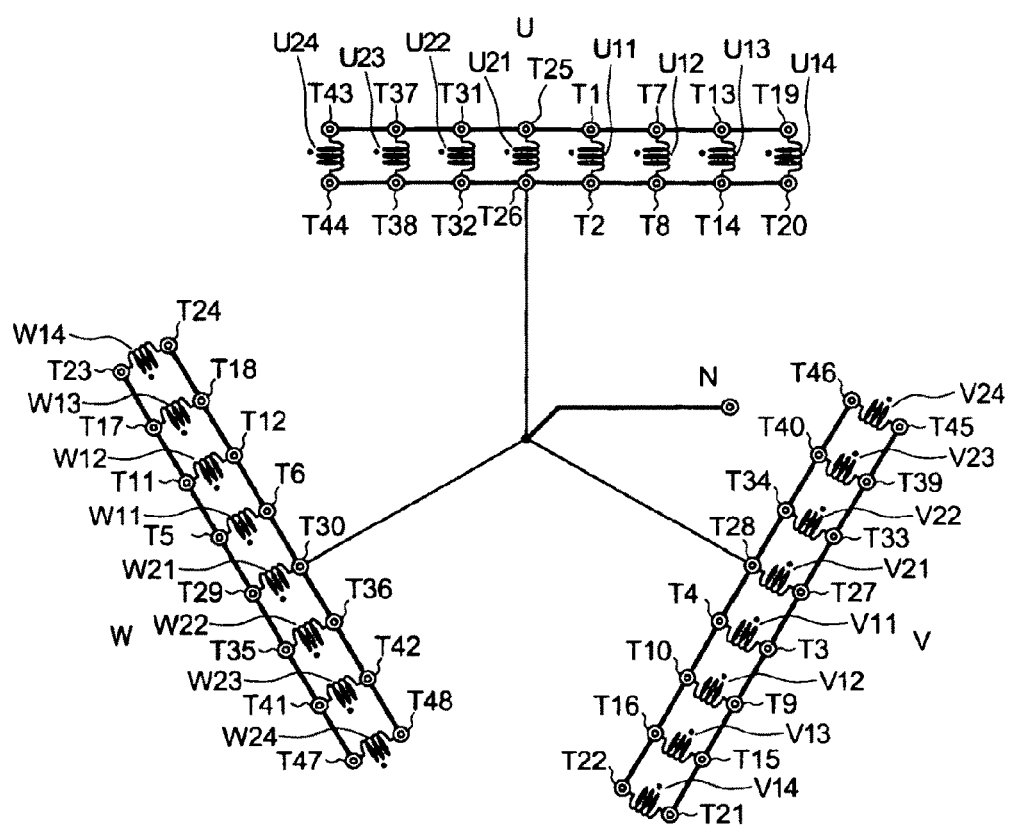
FIG. 23 is an equivalent circuit diagram of a coil unit of the coil connection control apparatus according to a first connection example in an embodiment of the invention.

In the circuit shown in FIG. 20, if the triacs Q1, Q2, Q3, Q4, Q5, Q6, Q7, Q8, Q9, Q10, Q11, Q12, Q13, and Q14 are set to the ON (conduction) state so as to configure the U-phase coil, if the triacs Q15, Q16, Q17, Q18, Q19, Q20, Q21, Q22, Q23, Q24, Q25, Q26, Q27, and Q28 are set to the ON (conduction) state so as to configure the V-phase coil, and if the triacs Q29, Q30, Q31, Q32, Q33, Q34, Q35, Q36, Q37, Q38, Q39, Q40, Q41, and Q42 are set to the ON (conduction) state so as to configure the W-phase coil (refer to FIG. 22), the terminals T1, T7, T13, T19, T25, T31, T37, and T43 are connected to each other; the terminals T3, T9, T15, T21, T27, T33, T39, and T45 are connected to each other; the terminals T5, T11, T17, T23, T29, T35, T41, and T47 are connected to each other; and the terminals T2, T8, T14, T20, T26, T32, T38, T44, T4, T10, T16, T22, T28, T34, T40, T46, T6, T12, T18, T24, T30, T36, T42, and T48 are connected to the neutral point port (N) (refer to FIG. 23).

In addition, the connection portion of connecting the terminals T1, T7, T13, T19, T25, T31, T37, and T43 becomes the U-phase output terminal; the connection portion of connecting the terminals T3, T9, T15, T21, T27, T33, T39, and T45 becomes the V-phase output terminal; and the connection portion of connecting the terminals T5, T11, T17, T23, T29, T35, T41, and T47 becomes the W-phase output terminal (refer to FIG. 23).

As a result, the equivalent circuit diagram of the armature coil circuit in the stator structure 1 becomes a three-phase circuit in a star wire connection having a neutral point as shown in FIG. 23. Therefore, a 1-coil 8-parallel circuit (¼ voltage coil) where eight coils are connected to each other in parallel to constitute each phase circuit can be implemented (first connection example).

According to the first connection example, since the both ends of one coil constitute an output terminal in each phase, an output voltage of about ¼ times the output voltage of the second connection example can be obtained, in comparison with the later-described second connection example (standard voltage coil) in which the both ends of the coil group where four coils are connected to each other in series constitute an output terminal in each phase.

Figure 24:
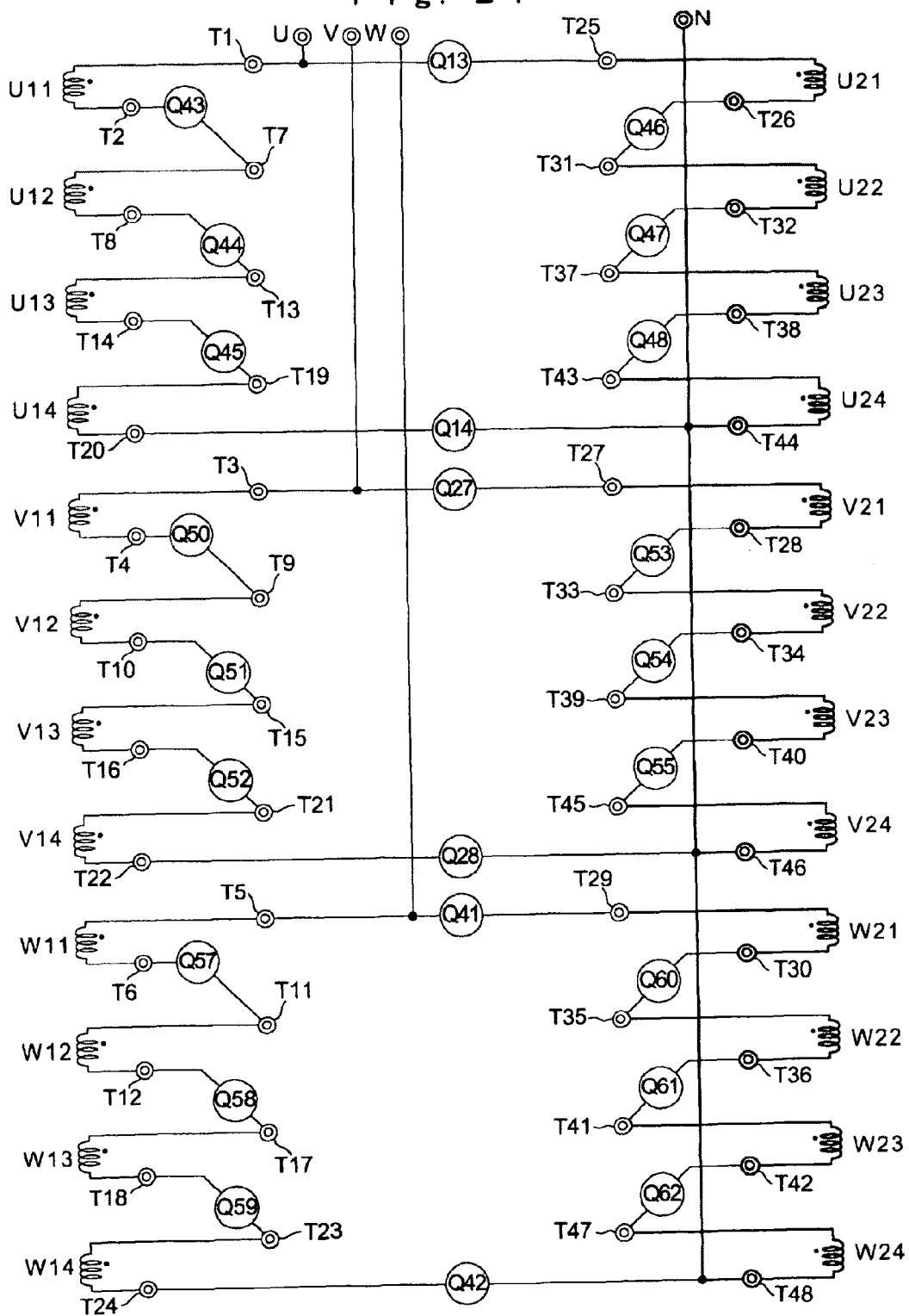
FIG. 24 is a circuit diagram for explaining a connection state of a coil connection control apparatus according to a second connection example in an embodiment of the invention.

Next, a second connection example of connecting the armature coil circuits in the coil unit 101 is described with reference to FIGS. 24 and 25.

Figure 25:
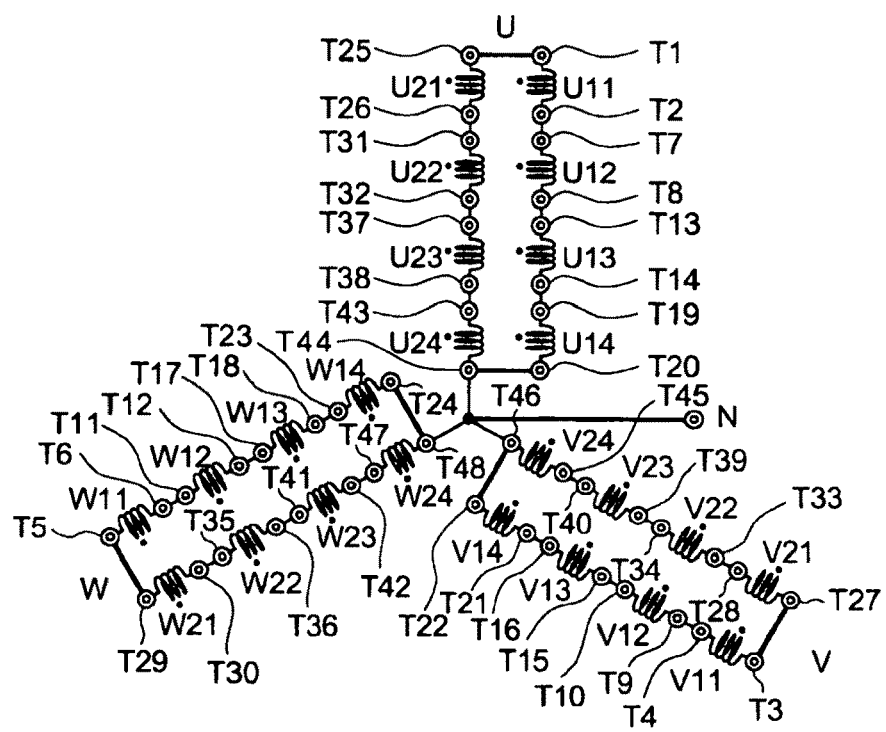
FIG. 25 is an equivalent circuit diagram of a coil unit of the coil connection control apparatus according to the second connection example in an embodiment of the invention.

In the circuit shown in FIG. 20, if the triacs Q13, Q14, Q43, Q44, Q45, Q46, Q47, and Q48 are set to the ON (conduction) state so as to configure the U-phase coil, if the triacs Q27, Q28, Q50, Q51, Q52, Q53, Q54, and Q55 are set to the ON (conduction) state so as to configure the V-phase coil, and if the triacs Q41, Q42, Q57, Q58, Q59, Q60, Q61, and Q62 are set to the ON (conduction) state so as to configure the W-phase coil (refer to FIG. 23), the terminals T1 and T25, the terminals T20 and T44, the terminals T2 and T7, the terminals T8 and T13, the terminals T14 and T19, the terminals T26 and T31, the terminals T32 and T37, and the terminals T38 and T43 are connected to each other, respectively; the terminals T3 and T27, the terminals T22 and T46, the terminals T4 and T9, the terminals T10 and T15, the terminals T16 and T21, the terminals T28 and T33, the terminals T34 and T39, and the terminals T40 and T45 are connected to each other, respectively; the terminals T5 and T29, the terminals T24 and T48, the terminals T6 and T11, the terminals T12 and T17, the terminals T18 and T23, the terminals T30 and T35, the terminals T36 and T41, and the terminals T42 and T47 are connected to each other, respectively; and the terminals T20, T44, T22, T46, T24, and T48 are connected to the neutral point port (N) (refer to FIG. 25).

In addition, the connection portion of connecting the terminals T1 and T25 becomes the U-phase output terminal; the connection portion of connecting the terminals T3 and T27 becomes the V-phase output terminal; and the connection portion of connecting the terminals T5 and T29 becomes the W-phase output terminal (refer to FIG. 25).

As a result, the equivalent circuit of the armature coil circuit in the stator structure 1 becomes a three-phase circuit in a star wire connection having a neutral point as shown in FIG. 25. Therefore, a 4-coil 2-parallel circuit (standard voltage coil) where serially connected four coil groups are connected to each other in series to constitute each phase circuit can be implemented (second connection example).

Figure 26:
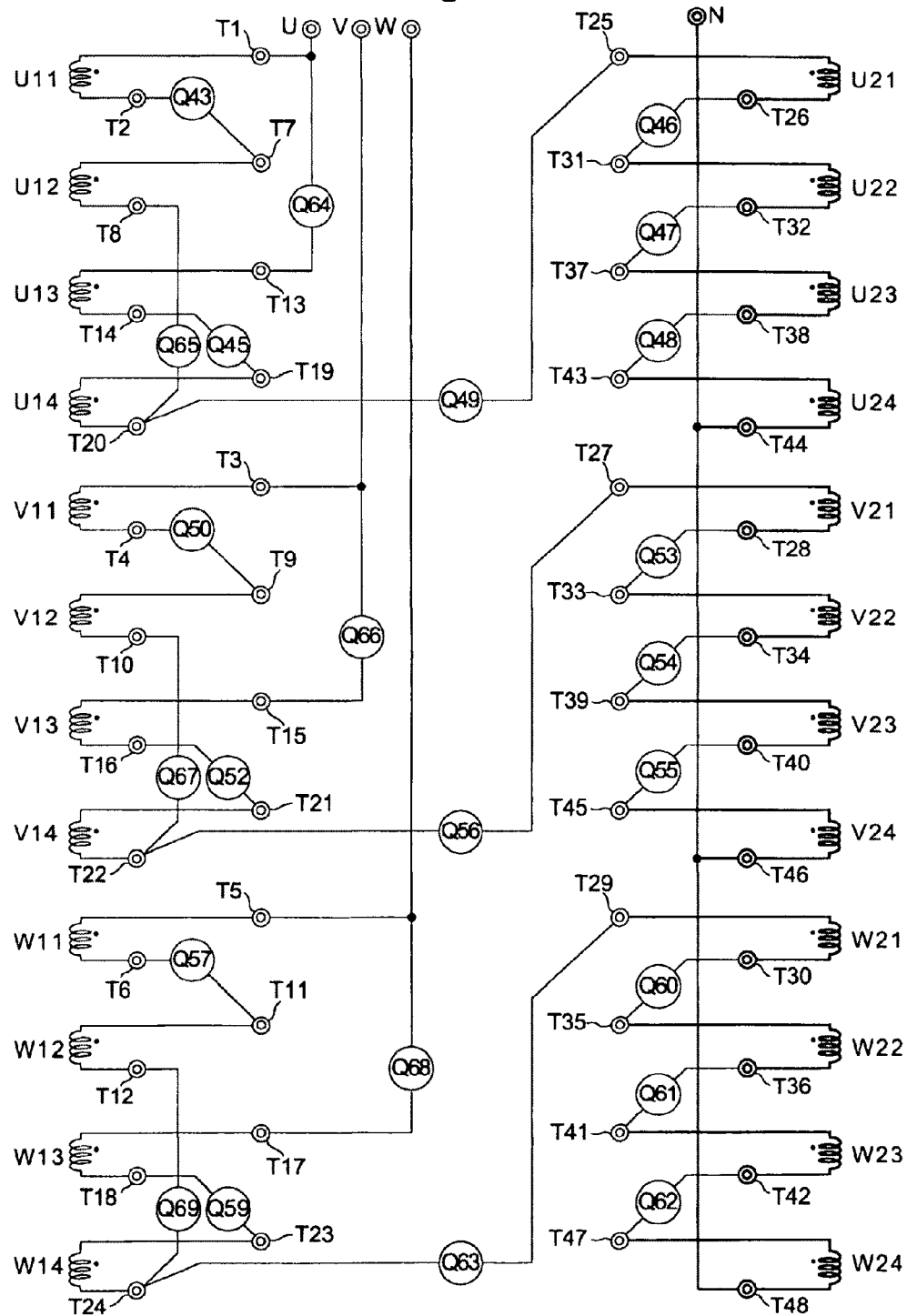
FIG. 26 is a circuit diagram for explaining a connection state of a coil connection control apparatus according to a third connection example in an embodiment of the invention.

Next, a third connection example of connecting the armature coil circuits in the coil unit 101 is described with reference to FIGS. 26 and 27.

Figure 27:
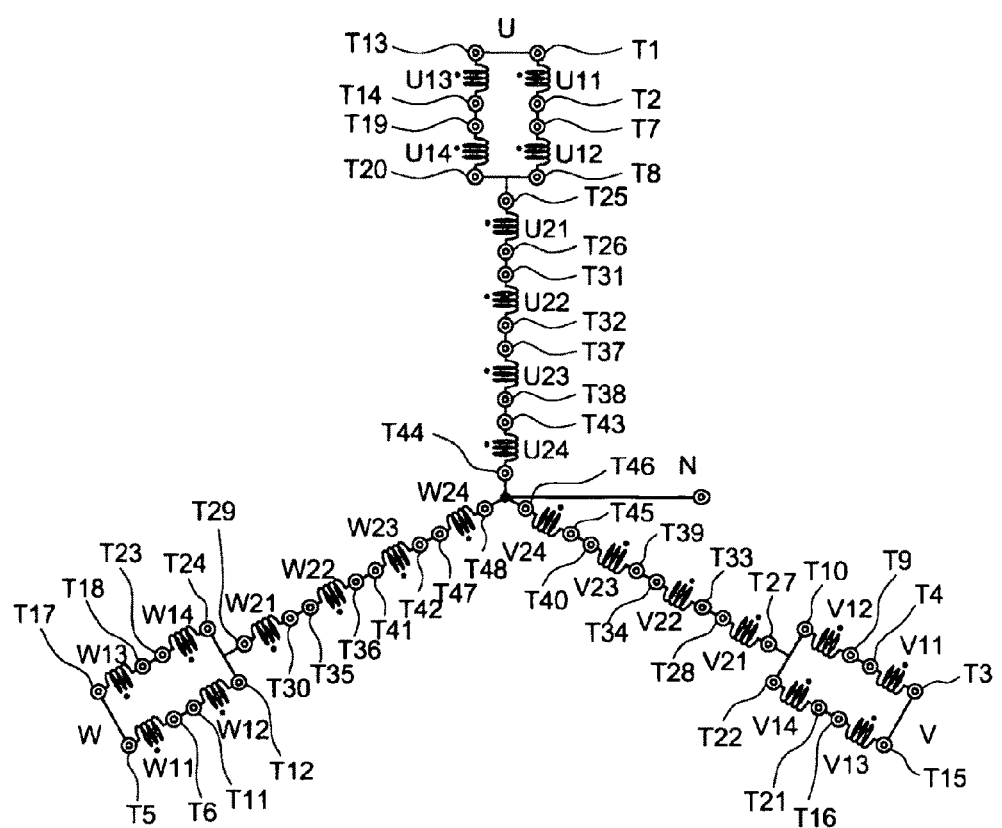
FIG. 27 is an equivalent circuit diagram of a coil unit of the coil connection control apparatus according to the third connection example in an embodiment of the invention.

In the circuit shown in FIG. 20 if the triacs Q43, Q45, Q46, Q47, Q48, Q49, Q64, Q65 are set to the ON (conduction) state so as to configure the U-phase coil, if the triacs Q50, Q52, Q53, Q54, Q55, Q56, Q66, Q67 are set to the ON (conduction) state so as to configure the V-phase coil, and if the triacs Q57, Q59, Q60, Q61, Q62, Q63, Q68, Q69 are set to the ON (conduction) state so as to configure the W-phase coil (refer to FIG. 26), the terminals T2 and T7, the terminals T14 and T19, the terminals T26 and T31, the terminals T32 and T37, the terminals T38 and T43, the terminals T20 and T25, the terminals T1 and T13, and the terminals T8 and T20 are connected to each other, respectively; the terminals T4 and T9, the terminals T16 and T21, the terminals T28 and T33, the terminals T34 and T39, the terminals T40 and T45, the terminals T22 and T27, T3 and T15, and the terminals T10 and T22 are connected to each other, respectively; the terminals T6 and T11, the terminals T18 and T23, the terminals T30 and T35, the terminals T36 and T41, the terminals T42 and T47, the terminals T24 and T29, the terminals T5 and T17, and the terminals T12 and T24 are connected to each other, respectively; and the terminals T44, T46, and T48 are connected to the neutral point port (N) (refer to FIG. 27).

In addition, the connection portion of connecting the terminals T1 and T13 becomes the U-phase output terminal; the connection portion of connecting the terminals T3 and T15 becomes the V-phase output terminal; and the connection portion of connecting the terminals T5 and T17 becomes the W-phase output terminal (refer to FIG. 27).

As a result, the equivalent circuit of the armature coil circuit in the stator structure 1 becomes a three-phase circuit in a star wire connection having a neutral point as shown in FIG. 27. Therefore, a 2-coil parallel circuit+4-coil serial circuit (1.5-times voltage coil) where serially-connected four coil groups are connected to two coil groups in parallel to constitute each phase circuit can be implemented (third connection example).

According to the third connection example, since both ends of each of the coils connected to the coil groups where four coils are connected to each other in series in each phase constitute an output terminal, an output voltage of about 1.5 times the output voltage of the second connection example can be obtained, in comparison with the second connection example (standard voltage coil) in which the both ends of the coil group where four coils are connected to each other in series constitute an output terminal in each phase.

Figure 28:
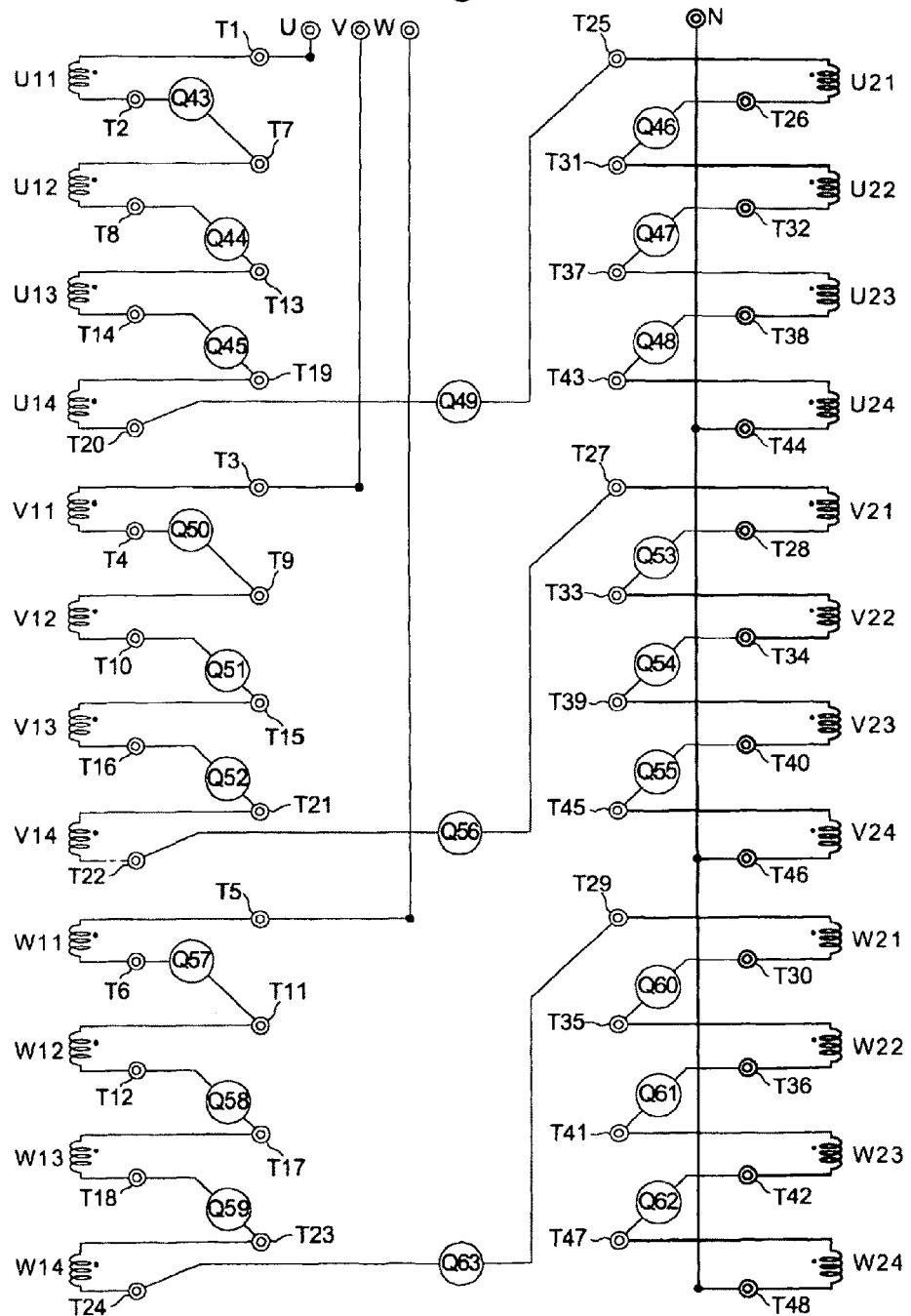
FIG. 28 is a circuit diagram for explaining a connection state of a coil connection control apparatus according to a fourth connection example in an embodiment of the invention.

Next, a fourth connection example of connecting the armature coil circuits in the coil unit 101 is described with reference to FIGS. 28 and 29.

Figure 29:
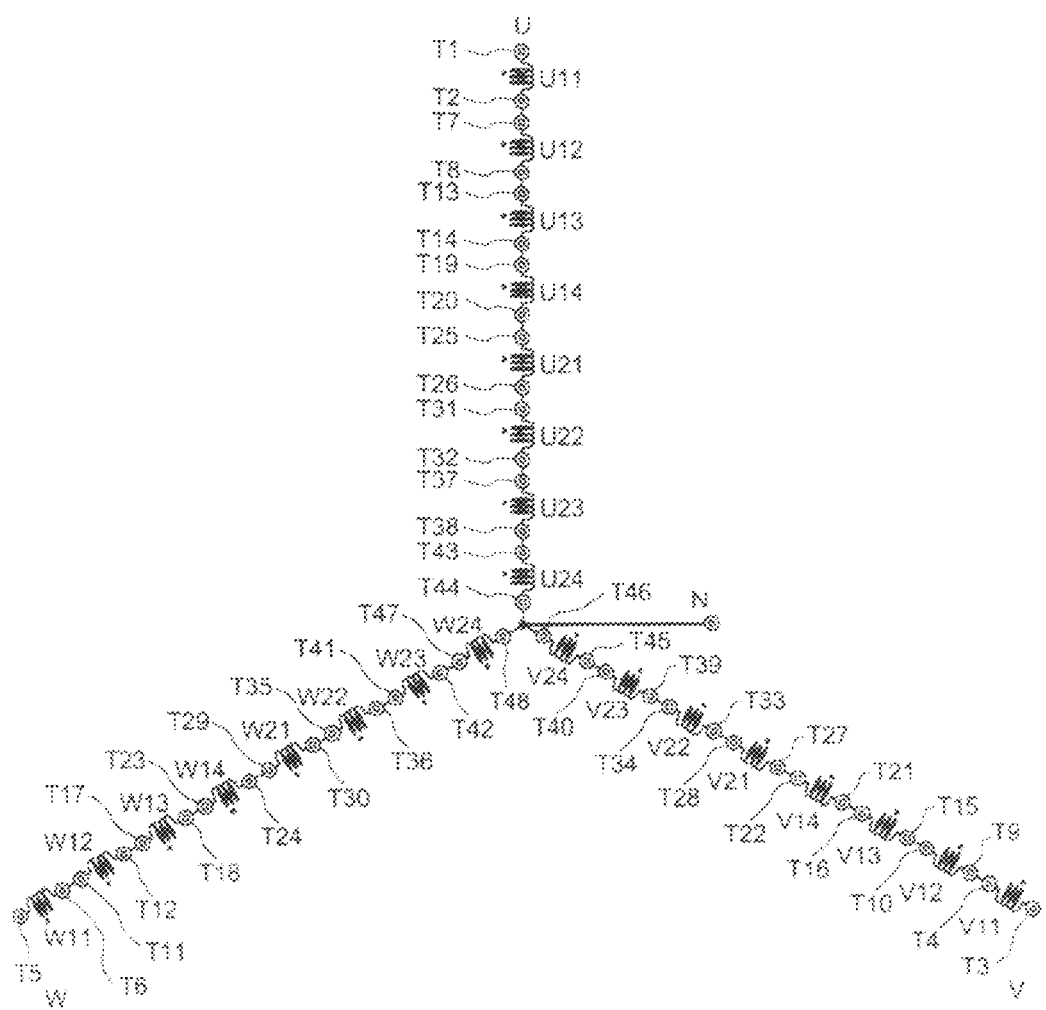
FIG. 29 is an equivalent circuit diagram of a coil unit of the coil connection control apparatus according to the fourth connection example in an embodiment of the invention.

In the circuit shown in FIG. 20, if the triacs Q43, Q44, Q45, Q46, Q47, Q48, Q49 are set to the ON (conduction) state so as to configure the U-phase coil, if the triacs Q50, Q51, Q52, Q53, Q54, Q55, Q56 are set to the ON (conduction) state so as to configure the V-phase coil, and if the triacs Q57, Q58, Q59, Q60, Q61, Q62, Q63 are set to the ON (conduction) state so as to configure the W-phase coil (refer to FIG. 28), the terminals T2 and T7, the terminals T8 and T13, the terminals T14 and T19, the terminals T26 and T31, the terminals T32 and T37, the terminals T38 and T43, and the terminals T20 and T25 are connected to each other, respectively; the terminals T4 and T9, the terminals T10 and T15, the terminals T16 and T21, the terminals T28 and T33, the terminals T34 and T39, the terminals T40 and T45, and the terminals T22 and T27 are connected to each other, respectively; the terminals T6 and T11, the terminals T12 and T17, the terminals T18 and T23, the terminals T30 and T35, the terminals T36 and T41, the terminals T42 and T47, and the terminals T24 and T29 are connected to each other, respectively; and the terminals T44, T46, and T48 are connected to the neutral point port (N) (refer to FIG. 29).

In addition, the terminal T1 becomes the U-phase output terminal; the terminal T3 becomes the V-phase output terminal; and the terminal T5 becomes the W-phase output terminal (refer to FIG. 29).

As a result, the equivalent circuit diagram of the armature coil circuit in the stator structure 1 becomes a three-phase circuit in a star wire connection having a neutral point as shown in FIG. 29. Therefore, an 8-coil serial circuit (2-times voltage coil) where serially connected eight coil groups constitute each phase circuit can be implemented (fourth connection example).

According to the fourth connection example, since the both ends of the coil group where eight coils are connected to each other in series constitute an output terminal in each phase, an output voltage of about 2 times the output voltage of the second connection example can be obtained, in comparison with the second connection example (standard voltage coil) in which the both ends of the coil group where four coils are connected to each other in series constitute an output terminal in each phase.

The switching control of each triac Q group corresponding to four types of the armature coil circuits in the coil unit 101 is performed based on the control signals from the generator control unit 800 that are formed from the switching allowable signals output from the control unit 410 to the generator control unit 800. However, for the three phases, with respect to the U-phase, the V-phase, and the W-phase of the triac Q group, the conduction timings of the triac Q group are controlled to be different.

Figure 30:
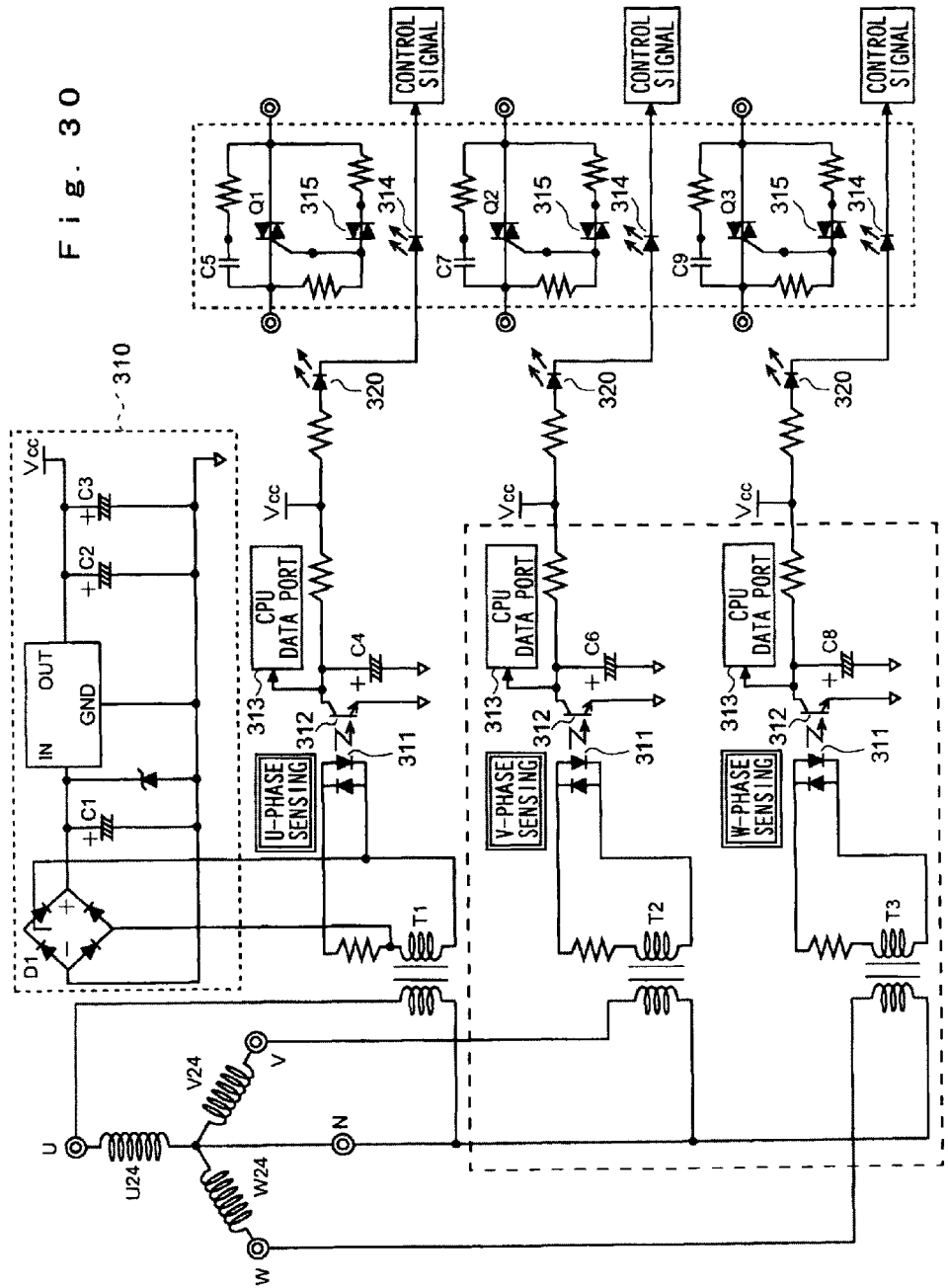
FIG. 30 is a circuit diagram for explaining a switching timing detection circuit of the coil connection control apparatus

In other words, the circuit selection control unit 300 includes a switching timing detection circuit that is generally used so as to control the conduction timings of the U-phase, V-phase, and W-phase triac Q groups as shown in FIG. 30. The switching timing detection circuit is configured to have a U-phase sensing circuit potion, a V-phase sensing circuit portion, and a W-phase sensing circuit portion so as to sense zero cross of each phase voltage. Since the sensing circuits of the phases are the same, the U-phase sensing circuit is exemplified for the description.

In the sensing circuit for sensing the zero cross of the U-phase voltage, a phase is sensed by detecting the voltage across the both ends of the coil U24; a transistor 312 is turned ON by light of the photo-coupler 311 that is disposed to the power source circuit 310 to emit light at the timing of the zero cross; a control signal for conducting the triac Q group is output from a CPU data port 313 of the generator control unit 800; and the triac Q1 is allowed to be conducted by turning ON the a bi-directional diode 315 through a photo-coupler 314. The triac Q1 is a representative one of twenty-three triacs in U-phase shown in FIG. 20. A desired triac group in each triac is conducted at the time of zero cross by a control signal.

In addition, the photodiode 320 is provided for a monitor and corresponds to the indicator 506 of the aforementioned manipulator 50.

Due to the switching timing detection circuit, the zero cross position is detected, the ON/OFF of each switching device in each phase is controlled, so that a rapid applying a voltage during the three-phase AC driving can be prevented at the time of switching the switching devices.

In an inverter magnetic electricity generator system, no-load output voltage characteristics of a magnetic electricity generator in the case where an armature coil circuit configured according to the aforementioned first to third connection examples are shown in FIG. 31. In FIG. 31, a ¼ voltage output coil corresponds to the first connection example; a standard voltage coil corresponds to the second connection example; a 1.5-times voltage coil corresponds to the third connection example; and a 2-times voltage coil corresponds to the fourth connection example.

Hereinafter, operations of the electricity generator are described with reference to FIG. 31.

(1) In the case of selecting "Fixing" by using the selection switching switch 501 in the manipulator 500, the engine of the electricity generator is driven (typically, operation at 3500 rpm) in Region B of the Standard voltage coil (second connection example) that is the standard operation state, as shown in FIG. 31.

(2) In the case of selecting "Variable" by using the selection switching switch 501 in the manipulator 500, the operation modes 1 to 3 where automatic switching of the armature coil circuit is performed and the operation mode 4 where the armature coil circuit is fixed to 2-times coil voltage can be selected by the mode selection switch 502 at the time of selecting "Variable".

[a] Case of Selecting Operation Mode 1 (Automatic Switching Operation) by Using Mode Selection Switch 502

In this case, the operation is performed by automatically switching the armature coil circuit among the standard voltage coil (second connection example), the 1.5-times voltage coil (third connection example), and the 2-times voltage coil (fourth connection example).

The number of rotation of the engine is set to be in a range from 1500 rpm to 4000 rpm.

After the starting with the standard voltage coil to start up the engine, the operation of the electricity generator is performed in Region B. During the operation time, the voltage EDC and the current Id are always monitored in the inverter unit 400. If the average load ratio for 5 minutes is less than 60%, the operation is performed by switching the armature coil circuit to the 1.5-times voltage coil (third connection example). If the average load ratio for 5 minutes is less than 30%, the operation is performed by switching the armature coil circuit to the 2-times voltage coil (fourth connection example).

In the case where the load ratio is changed in an increasing behavior, if the average value for 5 minutes is fallen into a lower region of the lower threshold voltage value (for example, a lower limit voltage of 163 V) five times for 5 seconds, it is determined that capacitance is increased. Therefore, the armature coil circuit is switched to a low voltage coil.

In addition, in the case where the voltage value is increased, an upper limit voltage for switching to the armature coil circuit having a low output voltage is set so that an FET is not destructed by an overvoltage applied to the FET of the inverter circuit 403 in the inverter unit 400.

The switching threshold value or the number of switching operations for the armature coil circuit can be freely set by a software process that operates the CPU of the generator control unit 800.

According to the configuration, even in the case where the rating rotation number is dropped down to the half by activating the variable output characteristic, the rating voltage output can be secured by switching the armature circuit from the standard voltage coil to the 2-times voltage coil by the circuit selection control unit.

In addition, the voltage EDC and the current Id are always monitored, so that the armature coil circuit can be switched according to the change in the load. Therefore, the operation can be performed at a lower number of rotations of the engine, so that fuel consumption mileage can be improved.

In the case where the load connected is somewhat specified, the operation modes 2 to 4 are selected.

[b] Case of Selecting Operation Mode 2 (Automatic Switching Operation) by Using Mode Selection Switch 502

In this case, the operation is also performed by switching the armature coil circuit among the standard voltage coil (second connection example), the 1.5-times voltage coil (third connection example), the 2-times voltage coil (fourth connection example). However, after the starting with the standard voltage coil (second connection example), the operation is performed by immediately switching the armature coil circuit to the 1.5-times voltage coil (third connection example).

The number of rotation of the engine is set to be in a range from 1670 rpm to 3000 rpm.

During the operation time, the voltage EDC and the current Id are always monitored in the inverter unit 400. If the average load ratio for 5 minutes is less than 30%, the operation is performed by switching the armature coil circuit to the 2-times voltage coil (fourth connection example).

In the case where the load ratio is changed in an increasing behavior, if the average value for 5 minutes is fallen into a lower region of the lower threshold voltage value (for example, a lower limit voltage of 163 V) five times for 5 seconds, it is determined that capacitance is increased. Therefore, the armature coil circuit is switched from the 2-times voltage coil to the 1.5 voltage coil.

In the case where overload occurs, the load is disconnected, so that the output of the inverter circuit 40 is stopped.

[c] Case of Selecting Operation Mode 3 (Automatic Switching Operation) by Using Mode Selection Switch 502

In this case, the operation is performed by automatically switching the armature coil circuit between the 1.5-times voltage coil (third connection example) and the 2-times voltage coil (fourth connection example).

The number of rotation of the engine is set to be in a range from 1500 rpm to 2500 rpm.

After the starting with the 1.5 voltage coil (third connection example), the operation is performed by immediately switching the armature coil circuit to the 2-times voltage coil (fourth connection example).

During the operation time, the voltage EDC and the current Id are always monitored in the inverter unit 400. If the average load ratio for 5 minutes is less than 30%, the operation is performed by switching the armature coil circuit to the 2-times voltage coil (fourth connection example).

In the case where the load ratio is changed in an increasing behavior, if the average value for 5 minutes is fallen into a lower region of the lower threshold voltage value (for example, a lower limit voltage of 163 V) five times for 5 seconds, it is determined that capacitance is increased. Therefore, the armature coil circuit is switched from the 2-times voltage coil to the 1.5 voltage coil.

[d] Case of Selecting Operation Mode 4 (Fixing Operation) by Using Mode Selection Switch 502

In this case, the operation is performed by fixing the armature coil circuit to the 2-times voltage coil (fourth connection example).

The number of rotation of the engine is set to be in a range from 1500 rpm to 2000 rpm.

In the case where the start-up switch 505 of the manipulator 500 is turned on, the ¼ voltage coil that is an armature coil circuit of the electricity generator side suitable at the time of starting up the engine is selected.

In this case, even through an applying voltage (about 10 V) for driving is small, since the number of rotation (500 turns) required for the starting up can be obtained by being the armature coil circuit to be in the ¼ voltage coil, the electric motor can be started up by direct drive with a battery voltage which does not require a voltage booster circuit.

If the rotation of the engine is set up, the battery voltage is set to OFF, so that the driving is performed by switching to the standard voltage coil mode.

According to the aforementioned magnetic electricity generator, as shown in the first to fourth connection examples, the armature coil circuit can be selected by controlling the coil connection to the terminals T1 to T48 by controlling the ON/OFF of the switching device (triac) group by using the circuit selection control unit 300. Therefore, a plurality of types of output voltage characteristics corresponding to the circuits that are formed by connecting each of the coil groups (armature coils) in series or in parallel can be obtained, so that the fixing/variable voltage outputs can be obtained to supply the optimum voltages according to the loads of the electricity generator.

In addition, in the case where the operation as an electric motor is implemented by selecting an armature coil circuit (¼ voltage coil: fourth connection example) having a low applying voltage for driving by using the circuit selection control unit 300, since only the applying voltage for one coil is needed, the magnetic electricity generator can be operated as a DC electric motor that is directly driven by a battery power source. Accordingly, a transformer for increasing or decreasing the DC voltage of the battery power source or a start-up motor is not needed.

In addition, in the state that a structure of the stator armature coil is used as a common coil, a plurality of types of output voltage specifications can be easily switched by the connection of the switching device by using the circuit selection control unit 300, so that the manufacturing of the armature coils according to the output characteristics is not needed. As a result, in the process of manufacturing the armature coils of the stator structure 1, since the procedure changing so as to switch to different voltage specifications does not occur, the procedure changing process is removed, so that cost of managing many types of products can be reduced.

In addition, since one armature coil specification can be adapted to all the voltage types, so that manufacturing yield can be implemented. Therefore, production at a suitable time can be scheduled at an expected time that materials are inexpensive, and mass production of the armature coil can be implemented by the manufacturing yield, so that effective production cost can be reduced.

In addition, in any connection port (dedicated port) or coupler structure where a tap can be provided, a portion thereof wound with the armature coil excluding the portion corresponding to the tap can be used for different specifications. Therefore, in the case where a different specification is needed, the different specification can be manufactured only by using the molds for the connection ports and couplers, the manufacturing can be completed by minimum mold cost.

In the aforementioned examples of the magnetic electricity generator, the armature coil circuit that can be selected by the circuit selection control unit 300 is exemplified as the first to fourth connection examples for the description. However, various types of armature circuits can be designed by contriving the connection of the taps 1 to 48 by controlling the ON/OFF of the switching devices (triacs), so that various output characteristics can be obtained.

In addition, in the aforementioned examples, a coil connection control apparatus including the coil unit 101 and the circuit selection control unit 300 that is adapted to a magnetic electricity generator using a permanent magnet in a magnetic field is exemplified for description. However, the apparatus can be adapted to an armature coil structure of an electricity generator or an electric motor and a coil structure of a field coil or the like of an electric motor, so that the output characteristic can also be changed by adjusting the connection scheme for the external connection wire.

In the case where the invention is adapted to an electric motor, the ON resistance at the conduction time can be reduced by using FETs as the switching devices.

REFERENCE SIGNS LIST

1 stator structure
5 stator coil
5*a* U-phase coil
5*b* V-phase coil
5*c* W-phase coil
5*d* U-phase coil
5*e* V-phase coil
5*f* W-phase coil
10 stator core
20 (20A to 20D) coupler
25 connection port (intermediate connection port)
30 harness
30A, 30B, 30C external connection wire
33, 34, 35, 36 connector
51*a*, 52*a* coil
51*b*, 52*b* coil
51*c*, 52*c* coil
51*d*, 52*d* coil
51*e*, 52*e* coil
51*f*, 52*f* coil
100 magnetic electricity generator
101 coil unit
102 rotator
103 permanent magnet
200 engine
300 circuit selection control unit
400 inverter unit
401 rectifying circuit
402 smoothing condenser
403 inverter circuit
500 manipulator
501 selection switching switch
502 mode selection switch
600 motor drive unit
700 battery
800 generator control unit
T1 to T30 terminal (connection port, intermediate connection port)
T1 to T48 terminal (connection port)

The invention claimed is:

1. A coil structure, comprising:
   a stator core;
   a plurality of protruding poles corresponding to the number of slots,
   a stator coil wound around each of said plurality of protruding poles;
   a connection port connected to one end of each of said stator coils via an external connection wire, and
   each of said connection ports is selectively connected to each of said stator coils to obtain a predetermined coil output voltage.

2. A magnetic electricity generator having armature coils and a magnet, comprising:
   connection ports that are disposed to both ends of each of slots of the armature coils; and
   external connection wires that selectively connect the connection ports of the armature coils to obtain a predetermined coil output voltage and current.

3. A magnetic electricity generator having armature coils and a magnet,
   wherein the armature coils are configured with a plurality of circuits of three-phase armature coils,
   coil groups of each phase coil of the three-phase armature coils are divided into two or more coil groups, connection ports are disposed to each coil group, and intermediate connection ports are disposed to one coil group or a plurality of the coil groups of each phase coil, and the connection ports and the intermediate connection ports are selectively connected with wires between the three-phase coils to obtain a predetermined coil output voltage and current.

4. The magnetic electricity generator according to claim 2, wherein the connection port is configured to be a tap as a dedicated port disposed to a coupler that is attached to the armature coil of a stator side of the magnetic electricity generator.

5. The magnetic electricity generator according to claim 3, wherein the connection port and the intermediate connection port are configured to be a tap as a dedicated port disposed to a coupler that is attached to the armature coil of a stator side of the magnetic electricity generator.

6. The magnetic electricity generator according to any one of claims 2 to 5, wherein the external connection wire selectively connects the connection ports so that the armature coils can be connected in parallel or in series.

7. A coil connection control apparatus comprising:

connection ports that are disposed to both ends of each of coils for each of slots, the coils winding protruding poles of a core, wherein a plurality of the protruding poles corresponding to the number of slots are disposed to the core;

a coil unit that is provided with switching device groups including a plurality of switching devices for performing connection and disconnection between the connection ports so that a plurality of types of coil circuits can be configured by switching the connection and disconnection between the connection ports; and a circuit selection control unit that selects a plurality of types of the coil circuits by controlling ON/OFF of each of the switching devices of the switching device group in the coil unit.

8. A magnetic electricity generator having armature coils and a magnet, comprising:

connection ports that are disposed to both ends of each of coils constituting the armature coils;

an armature coil unit that is provided with switching device groups including a plurality of switching devices for performing connection and disconnection between the connection ports so that a plurality of types of armature coil circuits can be configured by switching the connection and disconnection between the connection ports; and a circuit selection control unit that selects a plurality of types of the armature coil circuits by controlling ON/OFF of each of the switching devices of the switching device group in the armature coil unit.

9. The magnetic electricity generator according to claim 8, wherein the circuit selection control unit checks whether or not an output voltage or a load current at the time of driving the electricity generator reaches to an upper threshold value or a lower threshold value and switches the armature coil circuits by controlling ON/OFF of each of the switching devices of the switching device group.

10. The magnetic electricity generator according to claim 8, wherein the circuit selection control unit selects a plurality of types of armature coil circuits by controlling ON/OFF of each of the switching devices of the switching device group by manual selecting manipulation.

11. The magnetic electricity generator according to claim 8, further comprising a battery power source, wherein the armature coil circuit is selected by the circuit selection control unit so that the magnetic electricity generator can be operated as a DC electric motor that is directly driven by the battery power source.

* * * * *